(12) United States Patent
Muševič

(10) Patent No.: US 11,712,850 B2
(45) Date of Patent: Aug. 1, 2023

(54) MACHINE AND A METHOD FOR ADDITIVE MANUFACTURING OF THREE-DIMENSIONAL OBJECTS

(71) Applicant: AIONIS D.O.O., Ljubljana (SL)

(72) Inventor: Nataša Muševič, Ljubljana (SI)

(*) Notice: Subject to any disclaimer, the term of this patent is extended or adjusted under 35 U.S.C. 154(b) by 514 days.

(21) Appl. No.: 16/622,556

(22) PCT Filed: Jun. 12, 2018

(86) PCT No.: PCT/EP2018/065565
§ 371 (c)(1),
(2) Date: Dec. 13, 2019

(87) PCT Pub. No.: WO2018/229085
PCT Pub. Date: Dec. 20, 2018

(65) Prior Publication Data
US 2021/0146618 A1 May 20, 2021

(30) Foreign Application Priority Data
Jun. 13, 2017 (SI) ................. P-201700168

(51) Int. Cl.
*B29C 64/282* (2017.01)
*B33Y 10/00* (2015.01)
(Continued)

(52) U.S. Cl.
CPC ............ *B29C 64/282* (2017.08); *B22F 10/25* (2021.01); *B22F 10/32* (2021.01); *B22F 12/30* (2021.01);
(Continued)

(58) Field of Classification Search
CPC ... B29C 64/282; B29C 64/153; B29C 64/393; B29C 64/268; B33Y 10/00; B33Y 30/00; B33Y 50/02
See application file for complete search history.

(56) References Cited

U.S. PATENT DOCUMENTS

| | | | |
|---|---|---|---|
| 2015/0306700 A1* | 10/2015 | Honda | B33Y 30/00 219/121.21 |
| 2016/0031156 A1 | 2/2016 | Harkness et al. | |

(Continued)

FOREIGN PATENT DOCUMENTS

EP 2937163 B1 5/2017

*Primary Examiner* — Joseph S Del Sole
*Assistant Examiner* — John Robitaille
(74) *Attorney, Agent, or Firm* — Maschoff Brennan

(57) ABSTRACT

The disclosed invention resolves the problem of manufacturing three-dimensional objects by stacking two-dimensional layers of material in the third direction z. Described are a machine and a method for additive manufacturing of three-dimensional objects in which a predetermined final object is fabricated using the steps of the printing process (100) of individual curved three-dimensional print volumes (1, 2, 3 . . . Z) in a sequence (51). Powdered material (102) is melted in a melting volume (280) which is inside an intersection volume (28) and in which the energy exerted by at least two particle clusters (160,170) emitted from at least two spatially positioned sources (11, 12) of particles with mass adds up and exceeds the threshold required for melting of the powdered material. Machine and method according to the disclosed invention enable the fabrication in multiple different printing directions simultaneously.

12 Claims, 16 Drawing Sheets

(51) Int. Cl.
*B33Y 30/00* (2015.01)
*B33Y 50/02* (2015.01)
*B29C 64/153* (2017.01)
*B29C 64/393* (2017.01)
*B29C 64/268* (2017.01)
*B22F 10/25* (2021.01)
*B22F 12/30* (2021.01)
*B22F 12/44* (2021.01)
*B22F 12/45* (2021.01)
*B22F 12/57* (2021.01)
*B22F 10/32* (2021.01)

(52) U.S. Cl.
CPC .............. *B22F 12/44* (2021.01); *B22F 12/45* (2021.01); *B22F 12/57* (2021.01); *B29C 64/153* (2017.08); *B29C 64/268* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

2016/0228991 A1    8/2016  Ryan et al.
2019/0337085 A1*  11/2019  Hamaguchi ........ B23K 15/0026

* cited by examiner

MACHINE AND A METHOD FOR ADDITIVE MANUFACTURING OF THREE-DIMENSIONAL OBJECTS

This application claims priority to Slovenian Patent Application NO. P-2017-00168 filed Jun. 13, 2017.

FIELD OF INVENTION

The present invention belongs to the field of additive manufacturing of three-dimensional objects (3D printing) using powdered materials. More particularly, the present invention belongs to the field of 3D printing in which powdered materials are melted using kinetic energy of particles with mass.

BACKGROUND OF THE INVENTION

In the book 3D-Tisk by authors Tadeja Muck and Igor Križanovskij (Založba Pasadena, Nov. 2015, ISBN: 9789616661690) the 3D printing technologies are described in detail and are divided into four groups: (i) technologies in which objects are fabricated by material extrusion (ASTM—material extrusion); (ii) technologies in which objects are fabricated by selective solidifying of fluid photopolymers using a light source (ASTM: vat photopolymerization, material jetting); (iii) technologies in which powder materials are used and bound together with either binder material or by melting the powdered material using various thermal sources (ASTM—binder jetting, powder bed fusion, direct energy deposition); (iv) technologies in which objects are fabricated by stacking and binding or laminating the basic material in the shape of sheets (ASTM—sheet lamination).

In all the technologies described above the additive manufacturing of an object is performed by fabrication of individual, two-dimensional (2D) layers in a specific sequence by progressively stacking one layer on top of another in one defined direction, which is usually the height (z coordinate). Individual 2D and flat layers, which have a defined minimal thickness, are therefore stacked and either melted or illuminated or bonded in a specific sequence in one direction of height z. In the technologies of 3D printing in which objects are fabricated by extruding material from extruder heads, the individual object layer is fabricated in a point-by-point manner, each point having its own coordinate. The printing sequence of coordinates of such individual points is executed relative to the number of extruder heads for the given layer. This method of 3D printing is therefore extremely time-consuming, but it enables fabrication of wide range of materials, due to the melting of material in the print heads before the material exits from the printing head to the dedicated printing point.

The technologies of 3D printing in which objects are fabricated by solidifying liquid polymers with the use of light are also based on sequential fabrication of two-dimensional layers of photosensitive polymers. In these technologies each consecutive layer is added onto the previous, already solidified layer, and the surface of the following, added, liquid photopolymer layer is illuminated thereafter and solidified in this way. This method of 3D printing is extremely limited by the choice of material because the printed object needs to be fabricated using photosensitive polymers.

The technologies of 3D printing in which objects are fabricated by binding or stacking of powdered material are also based on fabrication of sequential 2D layers and fabricate objects by progressive stacking of individual, flat, two-dimensional layers on top of each other, in a layer-by-layer manner in the direction of height z.

THE TECHNICAL PROBLEM

The existing technologies for 3D printing, which use additive stacking of thin two-dimensional layers of material, represent a limitation in regards to printing resolution or outer object appearance, respectively. If a very precisely fabricated object with high printing resolution on its outer surface is desired, then stacking of appropriately thin layers of material would be necessary. The desired printing resolution of the object in the direction of print, or the thickness of an individual layer in height z, respectively, therefore determines the thickness of the added material layer. Known technologies for additive manufacturing of three-dimensional objects therefore do not enable the application of thicker layers, even though there would be enough binder material or melting or solidifying energy available to do so; if an object with a smooth outer surface is to be fabricated, the fabrication of layers which are all as thin as possible is necessary.

The main problem solved by invention according to the present disclosure is the problem of additive manufacturing of three-dimensional objects by sequential stacking of two-dimensional layers of material, where said layers are stacked in one main printing direction (third dimension, usually height z) and where the thickness of said layers, which are being stacked, also determines the outer edge of the object or its surface, respectfully and in this way the thickness of said layers effects the appearance of the fabricated object.

STATE OF THE ART

The technical problem of additive manufacturing of objects from powder materials with the use of localized melting is described in large numbers of records in literature. Hereinafter the focus will be given on a technique for melting powdered material using energy an electron beam which is described in some patents and patent applications. In patent application EP 2 918 396 A1 a machine and a method for additive manufacturing of 3D objects are described, which are based on localized melting of the powdered material using kinetic energy of an electron beam. The machine comprises a beam generator, a lens, a controller for the beam generator and a support stage on which the powder material is spread tightly. Beam generator produces a beam in the direction towards an individual, thin layer of powder material, and lenses are used for appropriating the focus of the beam onto the surface of said layer of powder material and directing the electron beam onto various positions on the thin layer of powdered material placed on the support element. The controller manages the beam generator in a way in which selectively a pulsating or continuous electron beam can be produced. Continuous electron beam locally melts the material due to the collision of electrons with the powdered material. A two-dimensional layer is formed by moving the beam over the layer of the object, which is being fabricated, and the process of material addition and fabrication of the next layer in the printing sequence in the direction of height z is repeated. The object is therefore fabricated in a sequence by progressively stacking two-dimensional layers on top of each other in height z; and within an individual layer by sequentially melting smaller two-dimensional regions of said layer.

Method for additive manufacturing described in patent number EP2937163 B1 is based on the use of two individual electron guns wherein the first electron gun is used to melt a given region of powdered material and the second electron gun is being used for eliminating static electricity of powdered material. The machine comprises of two electron guns, a vacuum chamber, a support stage on top of which thin layers of powdered material are being stacked gradually, and a control unit for controlling the electron guns. In the mentioned patent the powdered material is spread tightly on the support stage in a form of a thin, two-dimensional layer. The first electron gun is set to melt the material and is placed perpendicular to the powdered bed. The first electron gun produces an electron beam which selectively melts the powdered material. The second electron gun produces a second electron beam which is used to eliminate static electricity, is set at a lower energy and is tilted at a tilt angle set to either 45 degrees or less relative to the sample surface. The second electron gun is being used to eliminate secondary electrons that gathered in the material due to the melting performed using first electron beam. The mentioned patent describes a three-dimensional object being fabricated by gradual stacking and melting of thin two-dimensional layers of powdered material on top of each other, in a layer-by-layer manner. Only the first electron gun is being used for the purpose of melting powdered material.

Patent application WO2015/120168 A1 describes an energy gun of an additive manufacturing system comprising a plurality of energy beams composed of either photons or electrons or any other particles capable of melting the powdered material. Lenses are used for focusing two energy beams onto a layer of powdered material. The hot spots of energy beams are set at a distance and energy beams are constructed and arranged to move in unison at a controlled velocity and to follow one-another in desired direction over the substrate. The first energy beam produces a melt pool from the substrate, and the second energy beam is used for post heating the melted pool to a temperature lower than the melting threshold. This enables the use of the second energy beam to control the solidification rate of the melt pool. In the case where the travel direction of the electron gun is reversed, the second energy beam is used for producing a melt pool and the first energy beam is used for post heating to control the solidification rate of the melt pool. This additive manufacturing system enables the fabrication of a three-dimensional object in a layer-by-layer. The powdered material is applied onto the build table using a particle spreader.

Patent application US 2016/0031156 A1 describes a machine comprising a plurality of print heads located at different positions across space for extruding material into space. The machine uses magnetic levitation or sound levitation for manipulation of features of a part, which is being fabricated in space. Magnetic levitation is performed so that the object (part) is cooled down below the temperature of phase transition of matter being printed into a superconductive state in which matter behaves as an ideal diamagnetic and the magnetic force on the matter in magnetic field is high. Sound levitation of parts of the object is performed with multiple sound sources and appropriate acoustic reflectors creating a standing wave or a 3D standing wave pattern in space. The machine uses a plurality of print heads placed across space. Material is applied to the final printing point with the use of standard print heads, the positions of which determine the application of material. Object is fabricated with a combination of plurality of print heads and changing of said print heads' spatial orientation relative to the printed object or rotating and manipulating said object using magnetic or acoustic levitation. Printing of the object is based on addition of extruded material from the print heads, whilst the object is levitated using magnetic or acoustic force. Machine according to the mentioned patent application is the only one that enables the fabrication of an object from multiple printing directions simultaneously, but is limited by the application of the material through print heads. This machine enables fabrication of objects in a point-by-point manner. The invention according to the present disclosure differs from the patent application US 2016/0031156 A1 in a way that it comprises either two or more electron beams or beams of other particles with mass which are used for melting the powdered material in a predefined, curved, melting volume; whilst the machine described in patent application US 2016/0031156 A1 comprises a plurality of print heads. Invention described in the patent application US 2016/0031156 A1 uses magnetic and acoustic levitation to support the printed object or its assembly parts; whilst the invention according to the present disclosure describes a machine and a method where the already printed object part is mechanically supported, and the magnetic levitation is used for transport and application of the powdered material into a predefined melting volume.

SOLUTION TO TECHNICAL PROBLEM

Described machines and methods which enable additive manufacturing of objects using particle beams fabricate an object in a point-by-point, region-by-region and layer-by-layer manner. Overview of the current patents, patent applications or other documents on the subject of material melting with the use of particle sources shows that none of the above mentioned technical solutions uses a sum of either two or more clusters of particles with mass being emitted from either two or more particle sources and where the sum occurs at a predefined time and in a predefined three-dimensional space (hereinafter volume) for the purpose of melting material in a predefined curved three-dimensional volume (hereinafter melting volume) as it is claimed by the invention according to the present disclosure. All of the above mentioned technologies (using particle beams) enable the fabrication of three-dimensional objects by stacking and melting one thin, practically flat, two-dimensional layer on top of another; and within an individual layer, the melting is performed either in a point-by-point manner, or by melting of sequential regions of the surface of the individual layer.

Invention according to the present disclosure differs from all of the above mentioned technologies in that powdered material is melted using a sum of energies of either two or more particle clusters individually emitted from plurality of sources of particles with mass, in a predefined, curved, three-dimensional melting volume. This means that the material will only melt in those volumetric parts of a three-dimensional space where either two or more particle clusters overlap in space and time or where beams comprising said particle clusters, intersects, respectfully.

In the melting volumes the energy exerted by either two or more particle sources adds up and is higher than the energy required for melting of the powdered material. Disclosed are some example embodiments using electrons (electron guns), but the disclosed invention is not limited by the use of electrons because any particles with mass can be used which are capable of heating material by transferring the particles kinetic energy onto the powdered material during collision. Each particle source emits a beam comprising a cluster series comprising a plurality of particle clusters. Either two or more particle sources are spatially positioned in a way that the beams emitted from said particle sources spatially intersect in one or plurality of volumes. The intersections of particle beams form one or plurality of curved intersection volumes at a predefined moment in time. Using magnetic levitation or electric force or electrostatic pull, respectively the powdered material is transferred to the spatial intersection volumes of particle clusters. Powdered material melts only in those parts of a three-dimensional space noted as melting volume which is inside the intersection volume and in which the clusters of particles overlap spatially and in a timely manner so that the density and therefore available kinetic energy is higher than the energy threshold required for melting the powdered material. By predefining the time delays between arrivals of clusters of particles emitted from at least two particle sources located at different spatial positions and if necessary by controlling other parameters of particle sources, the shape and the position of the melting volume can be changed and in this way the shape and the amount of the melted powdered material.

Described machines and methods which enable additive manufacturing of objects using particle beams fabricate an object according to the principle of a point-by-point or region-by-region and layer-by layer fabrication. Invention according to the present disclosure enables additive manufacturing of 3D objects in an arbitrary volume-by-volume manner with the use of two or more particle sources emitting individual clusters of particles with mass which overlap in space and time in a controlled and predefined manner. The fabrication of three-dimensional objects according to the disclosed invention is not bound by progressive stacking of thin, two-dimensional layers or by the thickness of such layers which defines the external appearance of the object at the same time, respectfully. Invention described herein is also not limited by the number of printing volumes which can be printed simultaneously because either two or more particle beams can create a plurality of intersection volumes and can therefore melt material in plurality of melting volumes located at different positions in space simultaneously. Invention according to the present disclosure enables spatially independent printing meaning that larger print volumes can be fabricated inside of the object and therefore the printing process is made faster in this way, whilst smaller print volumes can be fabricated at the surface of the printed object. In this way, the desired higher print resolution on the objects surface is achieved and therefore an improved external appearance of the object, whilst printing the parts inside of the object can be made faster by fabricating larger print volumes which is achieved by enlarging the melting volume. Machine and method according to the present invention also differ from all other above described machines and methods in a way that for the purpose of material application, a magnetic force or an electrostatic pull onto powdered material is used. This enables the transport or the application of powdered material into predefined volumetric parts of a three-dimensional space where fabrication of print volumes of the object occurs, therefore the method and the machine according to the present invention is not limited by progressive stacking of flat two-dimensional layers in the third direction z.

Hereinafter the phrase 'particles with mass' will be shortened as 'particles'. Because the invention described herein differs from the other known inventions and therefore the terms used herein are new, hereinafter the definitions of terms used in this text are noted. The terminology used for description of the present invention is explained specifically for the purpose of clear definition of the following terms:

volume: is understood to be a specific three-dimensional space with limits or outer surface, respectfully;

curved volume: is a three-dimensional volume of which the outer surface is curved, and the size of which is not limited (meaning that the curved volume is limited itself but it can be of various sizes during fabrication). Curved volume is therefore not a two-dimensional layer with a specific height, and it is also not a small point with a permanently fixed size. Curved volume is therefore a term used to describe an arbitrary large plurality of points describing the interior parts of an enclosed curved surface of arbitrary size in a three-dimensional space;

print volume: is a curved volume in which all the steps of the printing process are being or shall be performed, from the outlet of powdered material 102 through the stopper 103 on the container 101, up to electrically discharging an already printed object part 1000 and by necessity the movement of said object part 1000 using multi-directional support system mechanization 110 or mechanization 114. The term 'print volume' is used for the purpose of marking a)a virtual print volume created in simulator 8 or b) a real print volume inside a real object which is being fabricated, such as object 3 (FIG. 14);

melting volume: is a curved volume in which the density of momentum of particles emitted from at least two particle sources 11, 12 exceeds the melting threshold of the powdered material 102 which is used for fabrication of object, such as an object 3, using the machine 1 and the method according to the disclosed invention;

intersection volume: is a curved volume in which at least two beams $E_1$, $E_2$ of particles emitted from at least two particle sources 11, 12 intersect and in which the melting volume 280 is formed;

The term "or" is used herein both in alternative in conjunctive sense unless otherwise indicated. Terms such as 'a', 'an', and 'the' are not intended to refer to only a singular entity but include the general class of which specific example may be used for illustration. The terminology herein used to describe specific embodiments of the invention, but their usage does not delimit the invention, except as outlined in the claims.

BRIEF DESCRIPTION OF THE DRAWINGS

Having thus described the invention in general terms, reference will now be made to the accompanying drawings, which are not necessarily drawn to scale, and wherein

Figure 1:
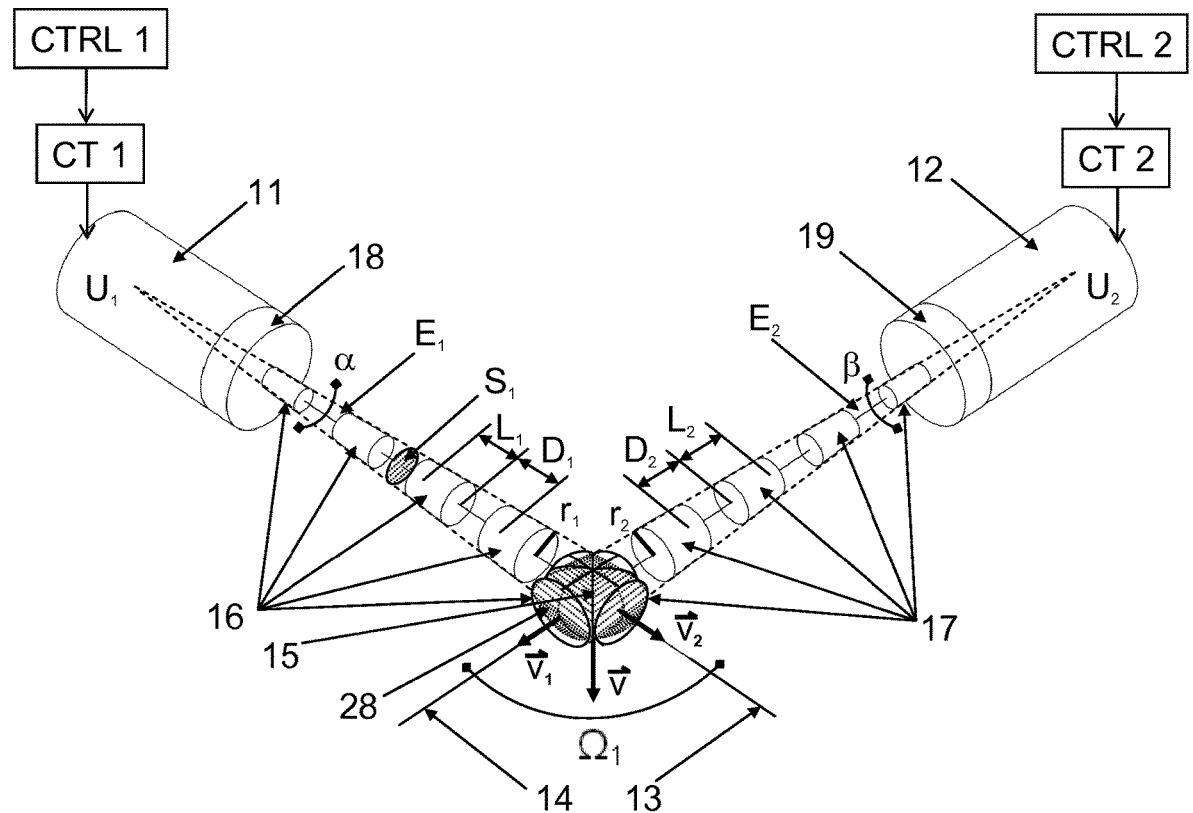
Figure 2:
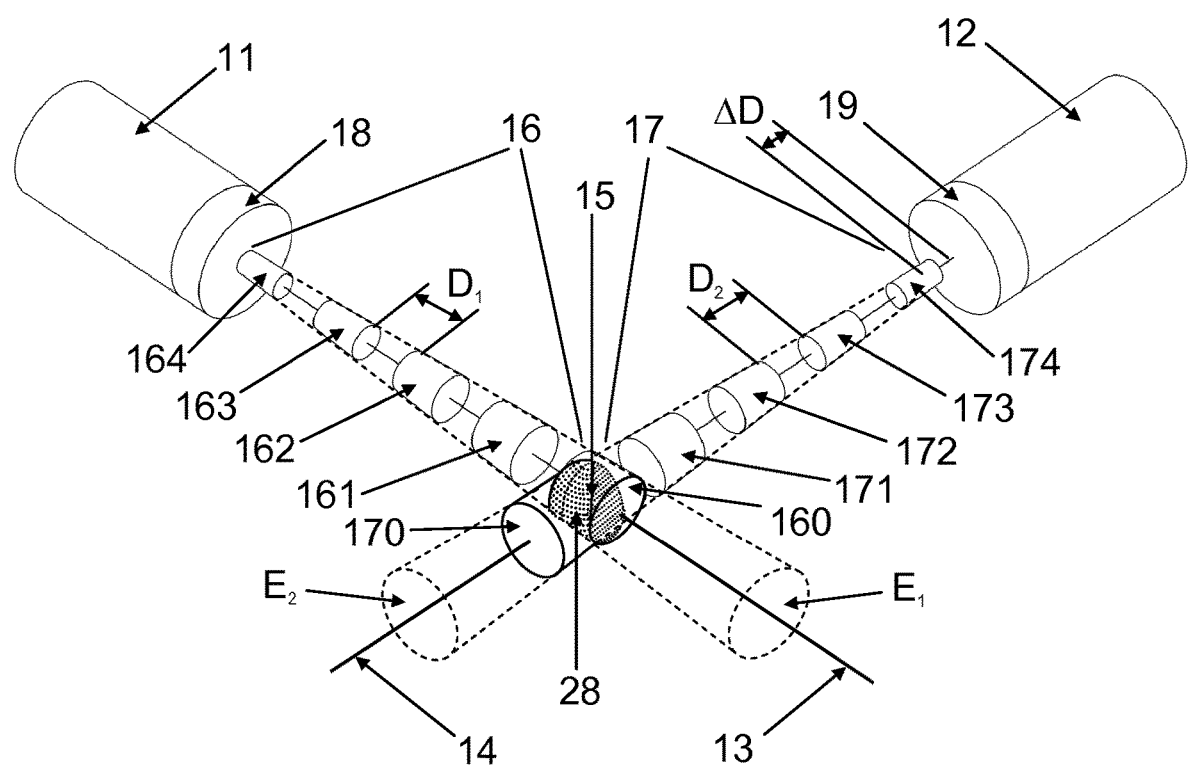
Figure 3:
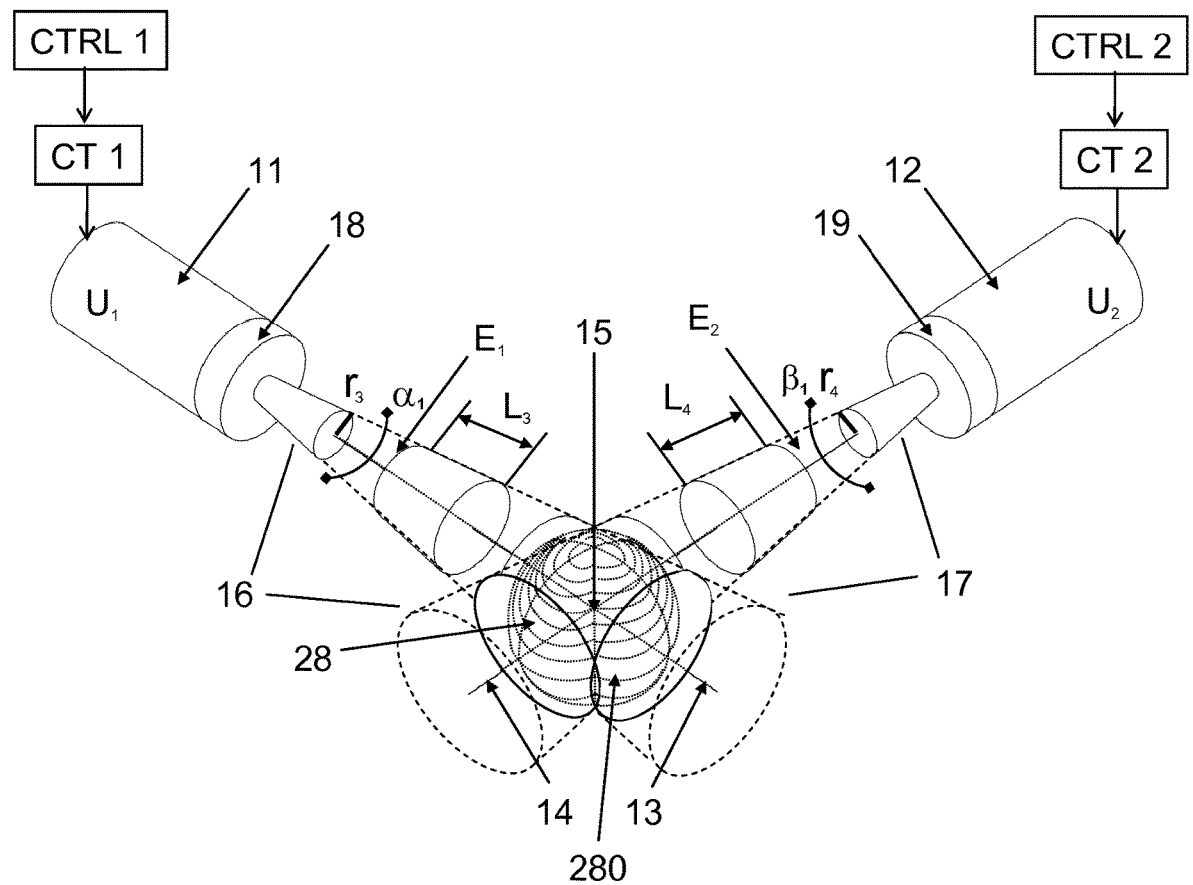
Figure 4:
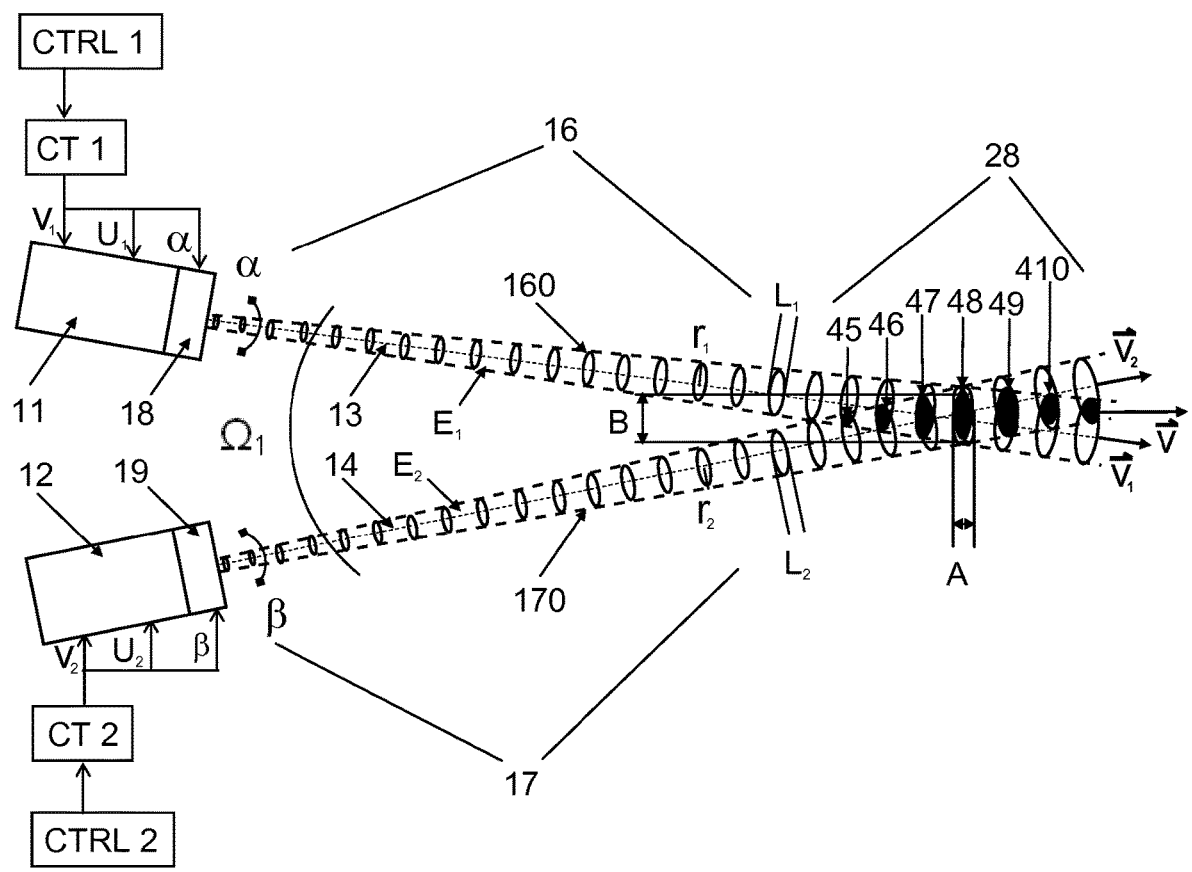
Figure 5:
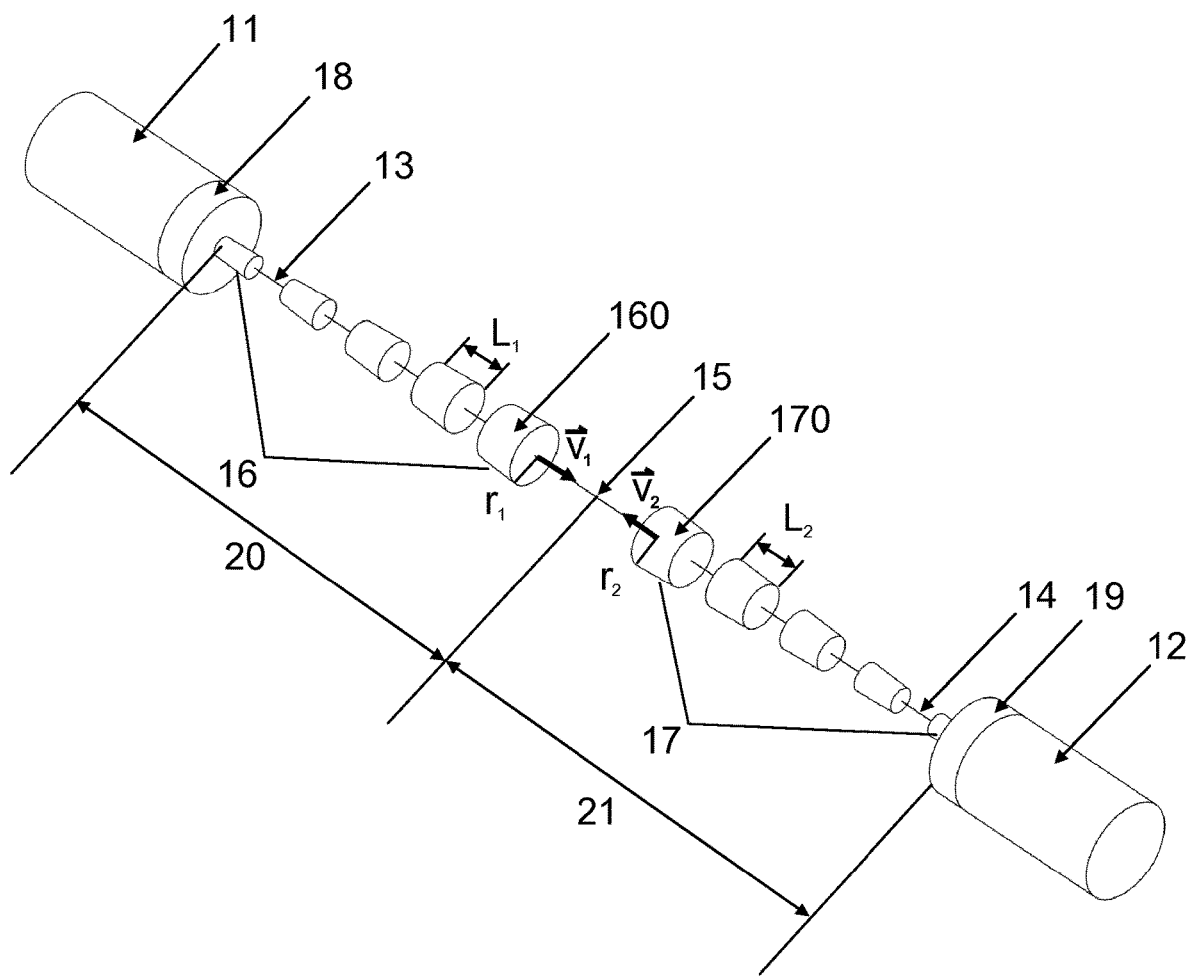
Figure 6:
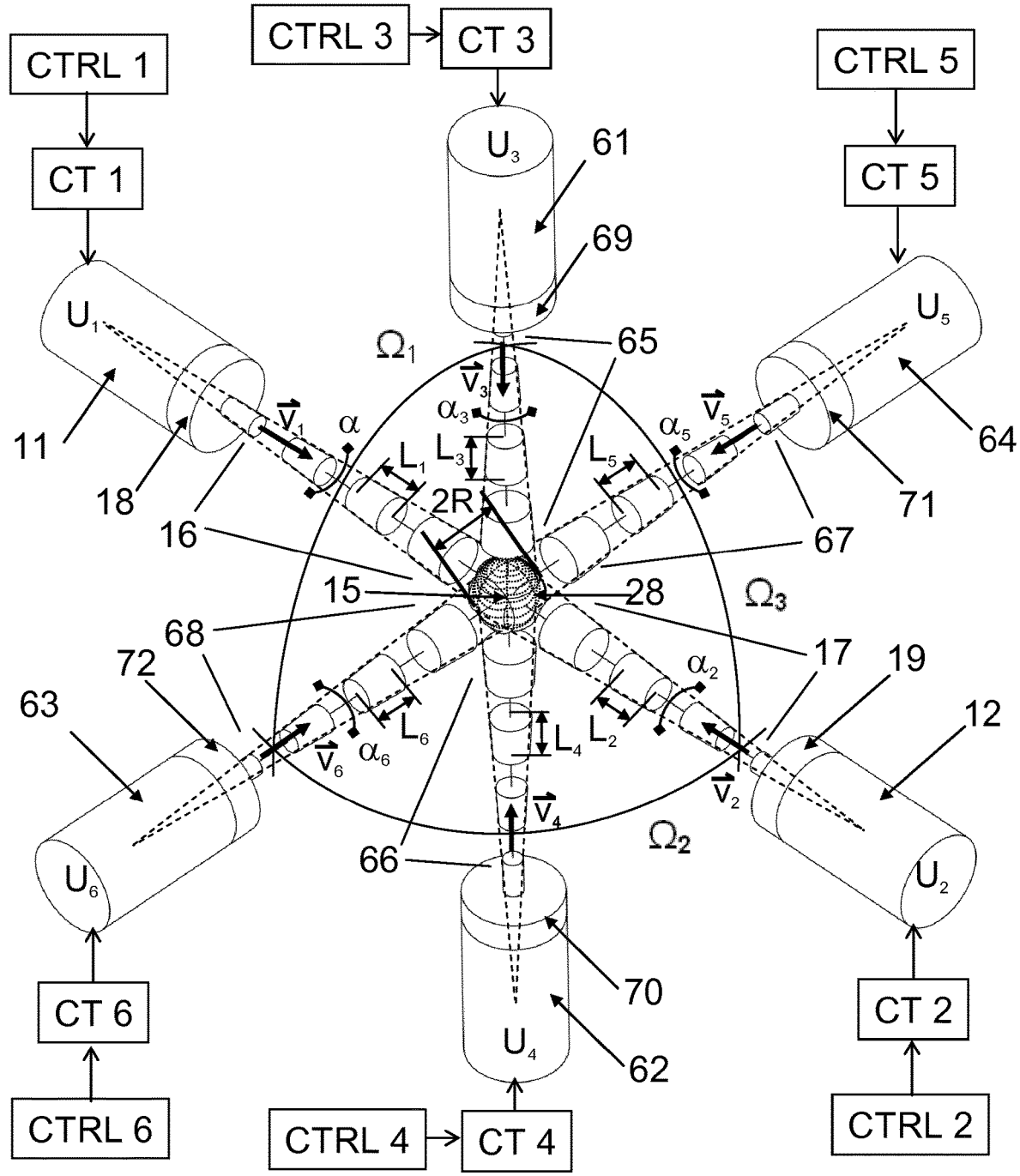
Figure 7:
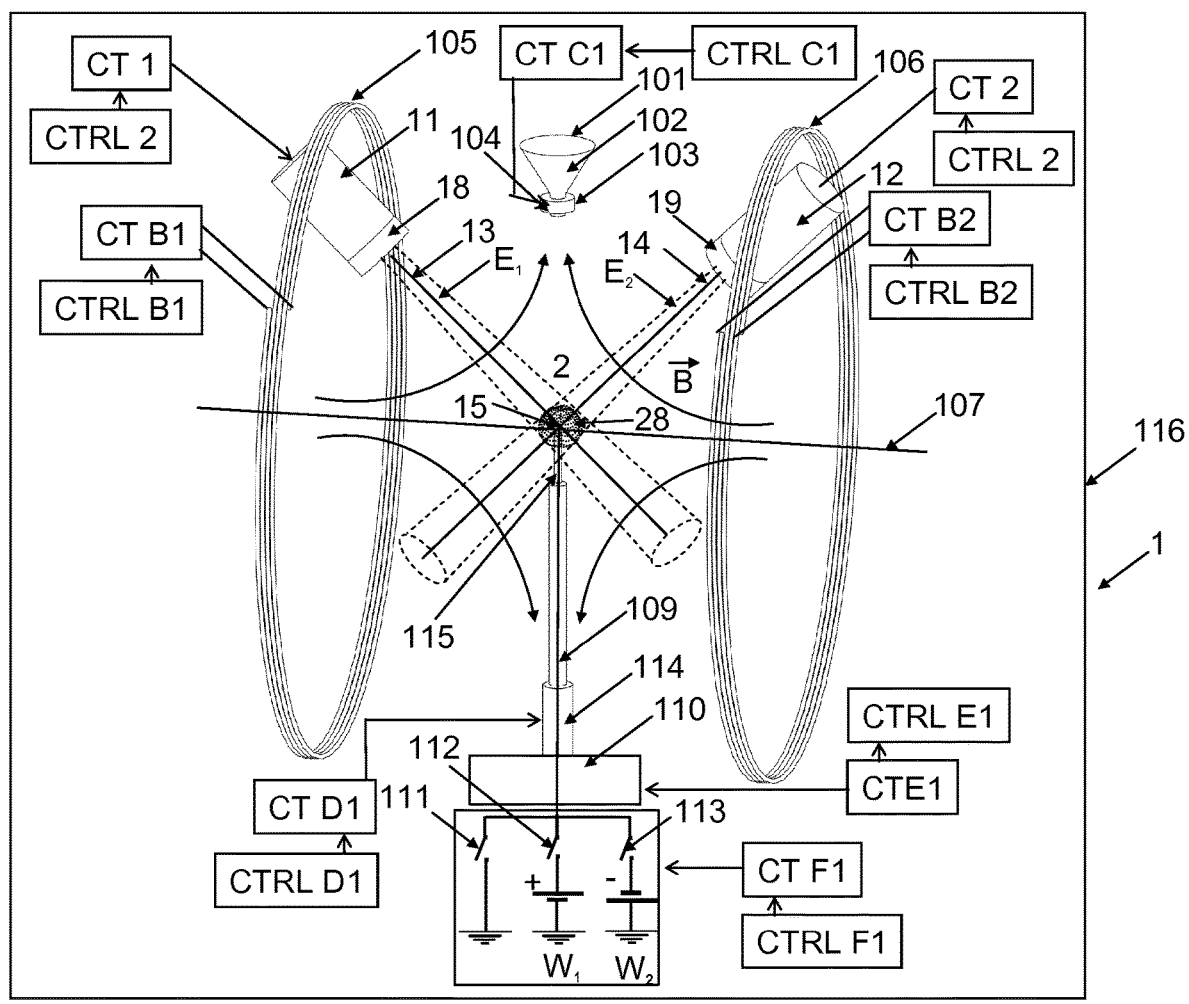
Figure 8:
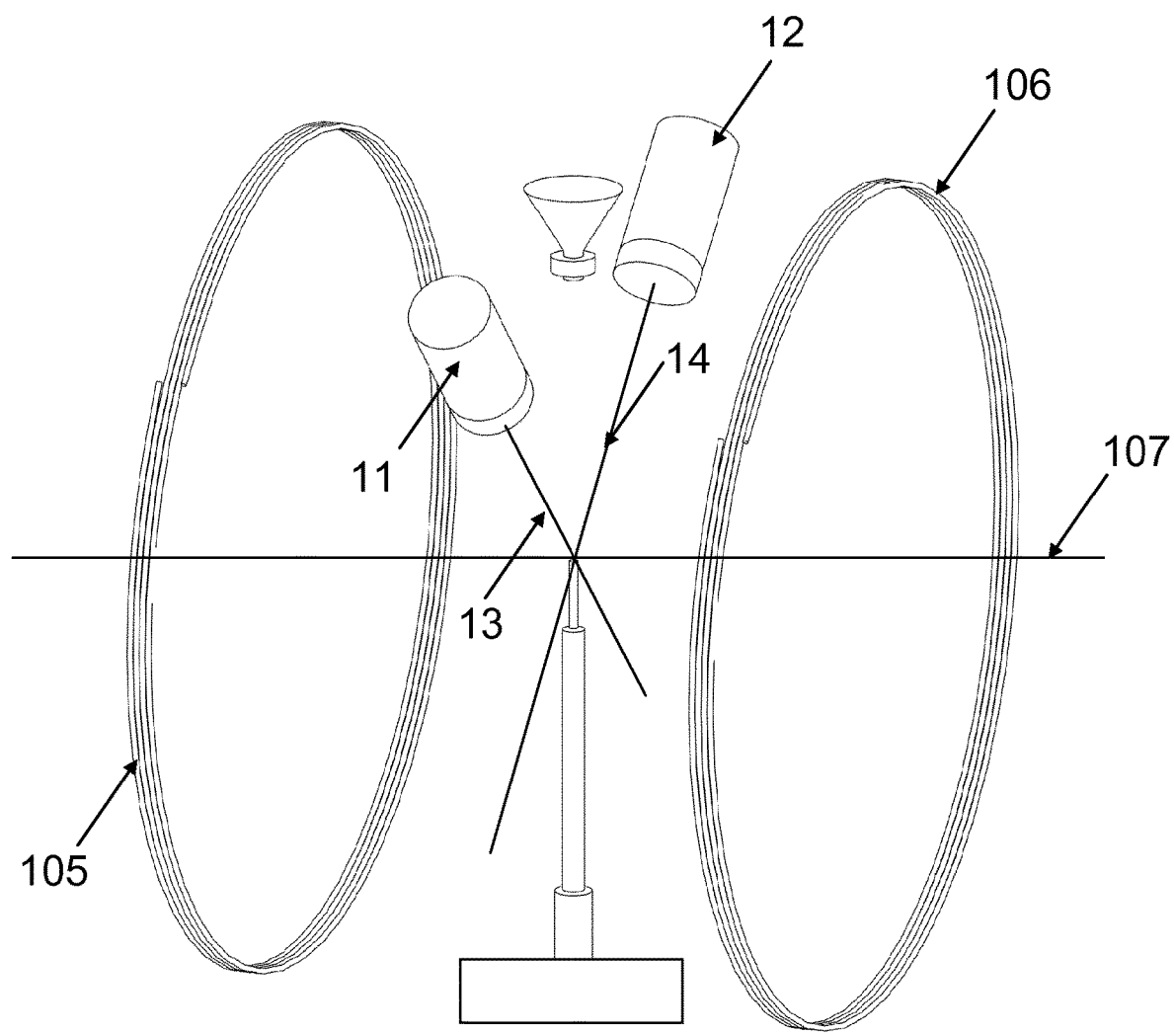
Figure 9:
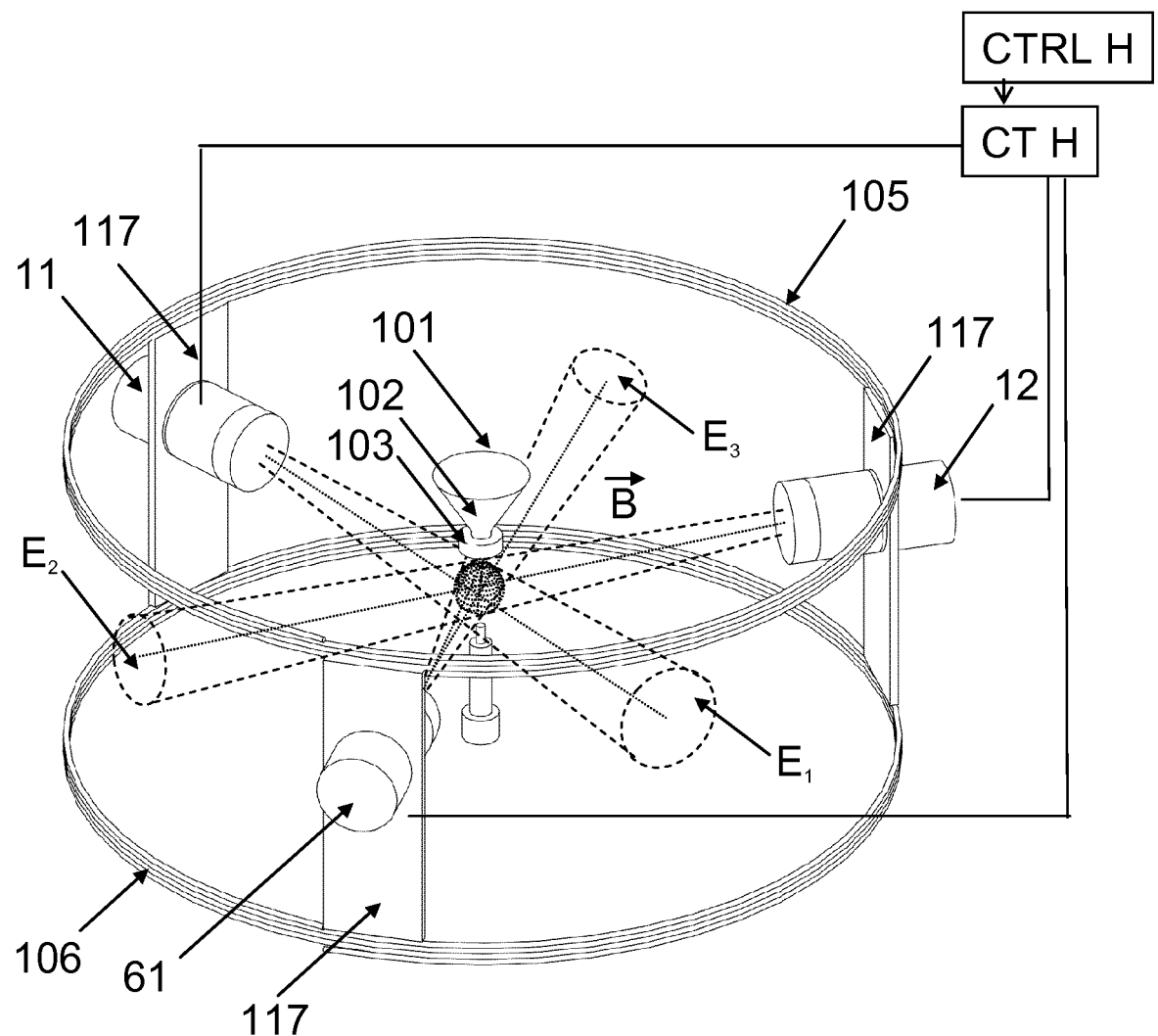
Figure 10:
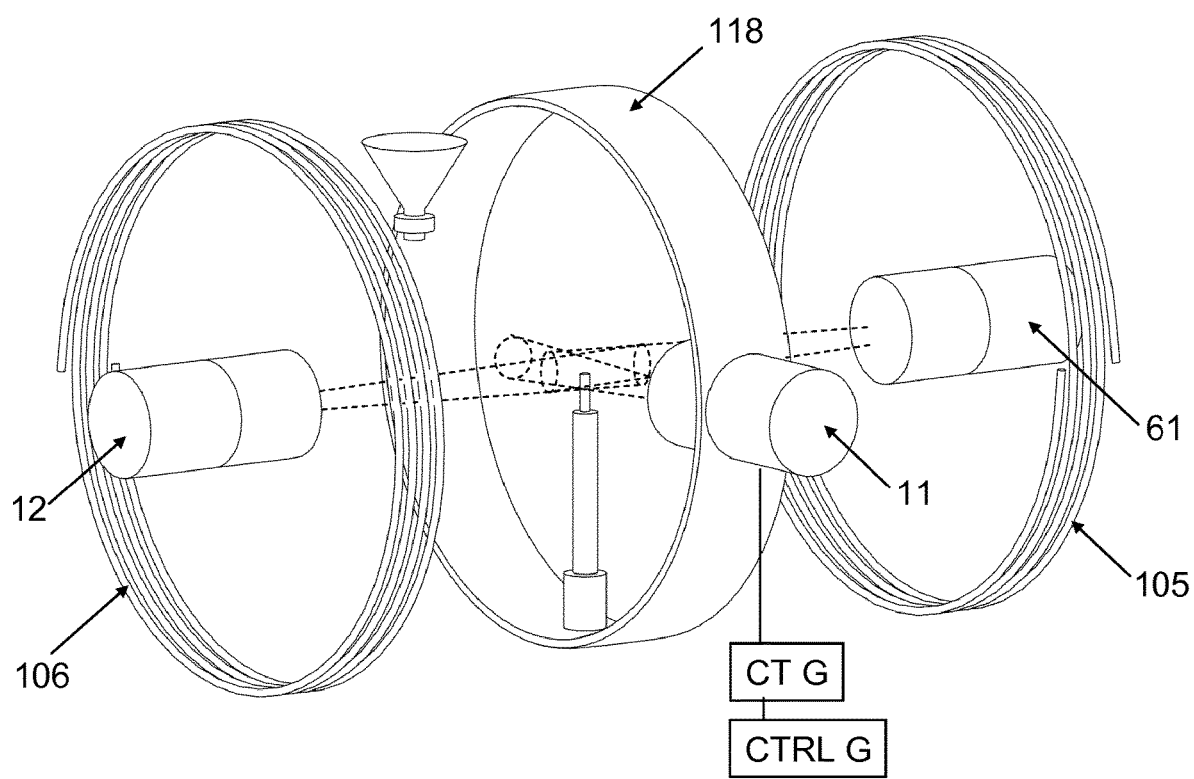
Figure 11:
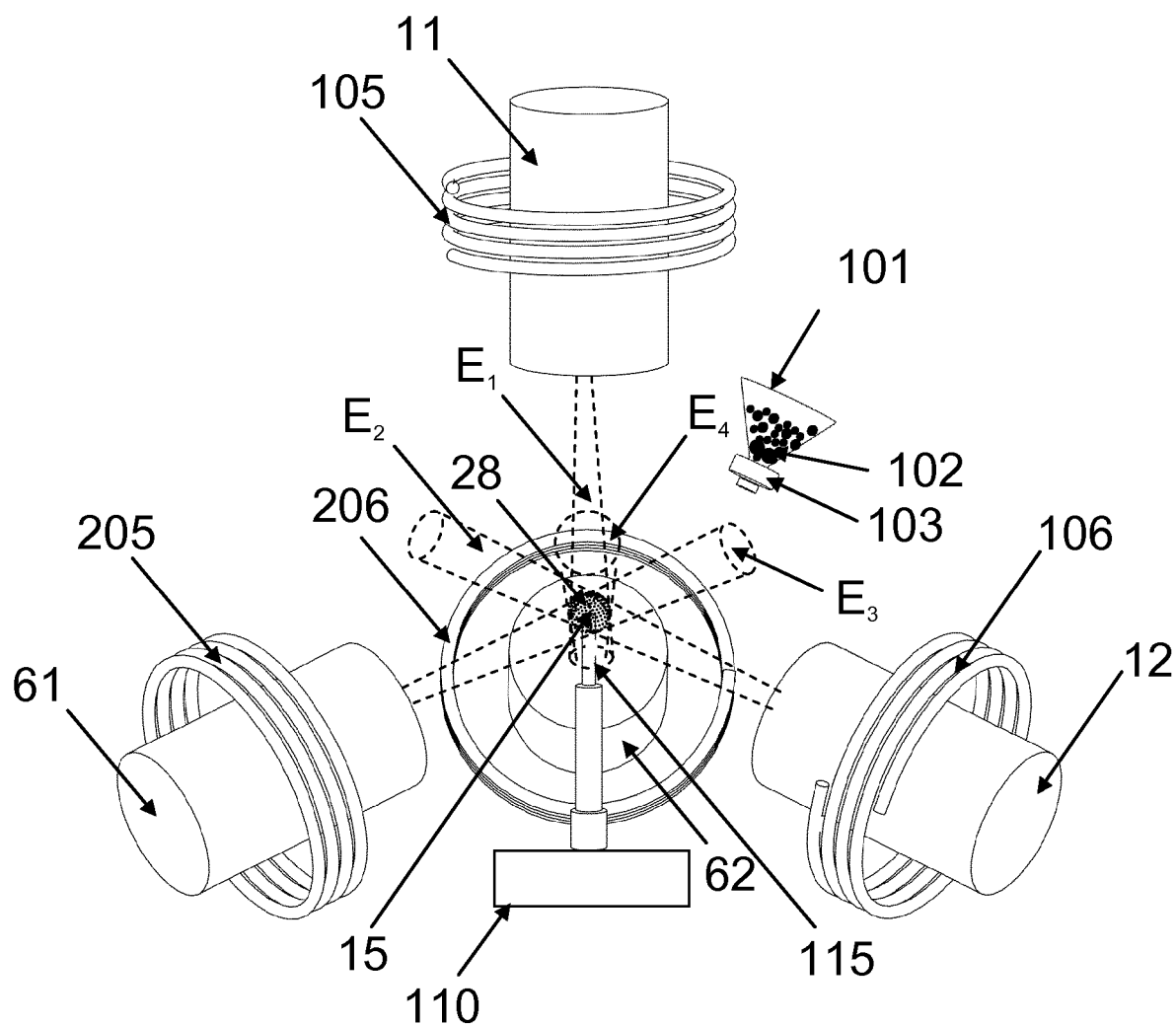
Figure 12:
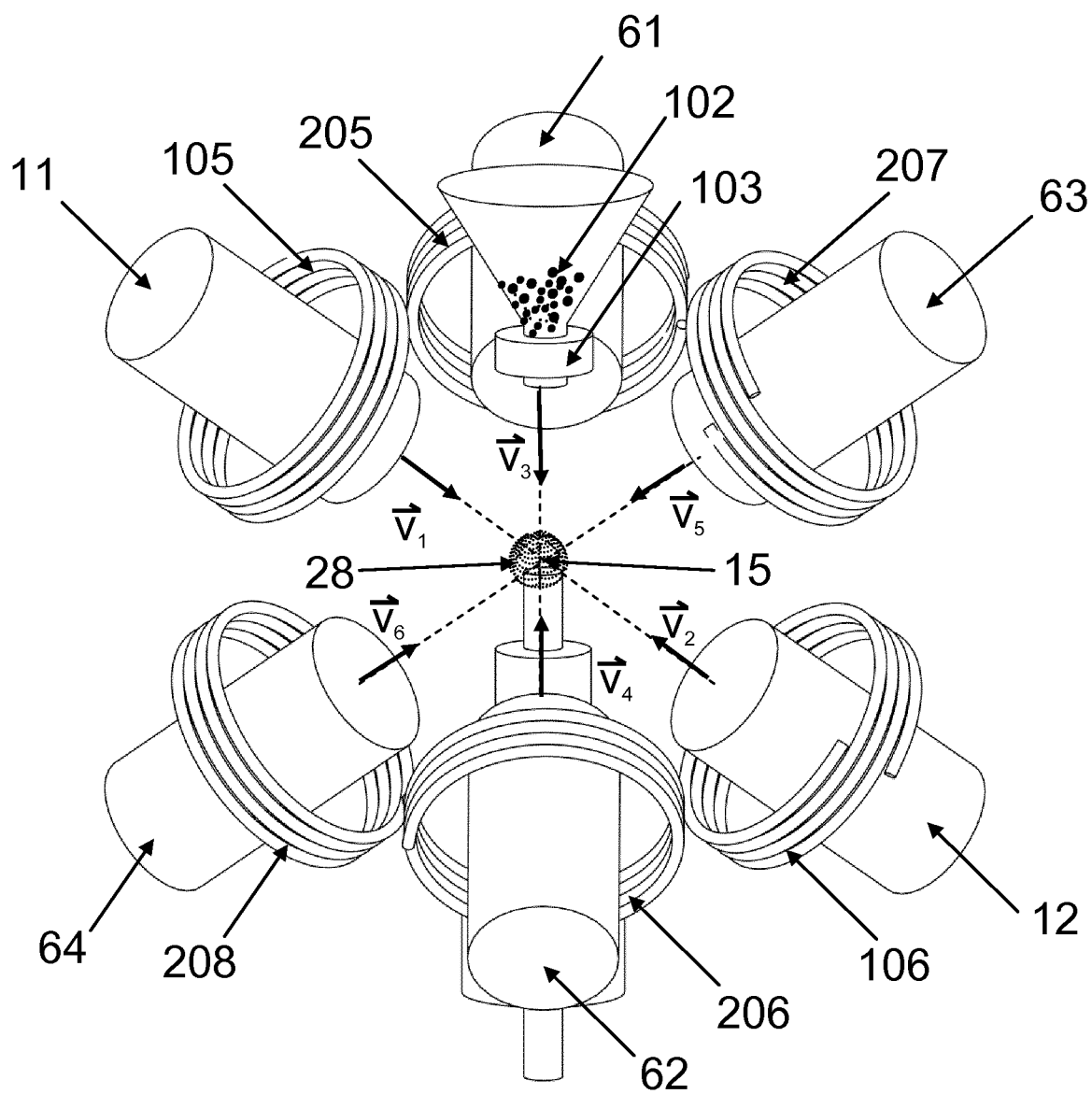
Figure 13:
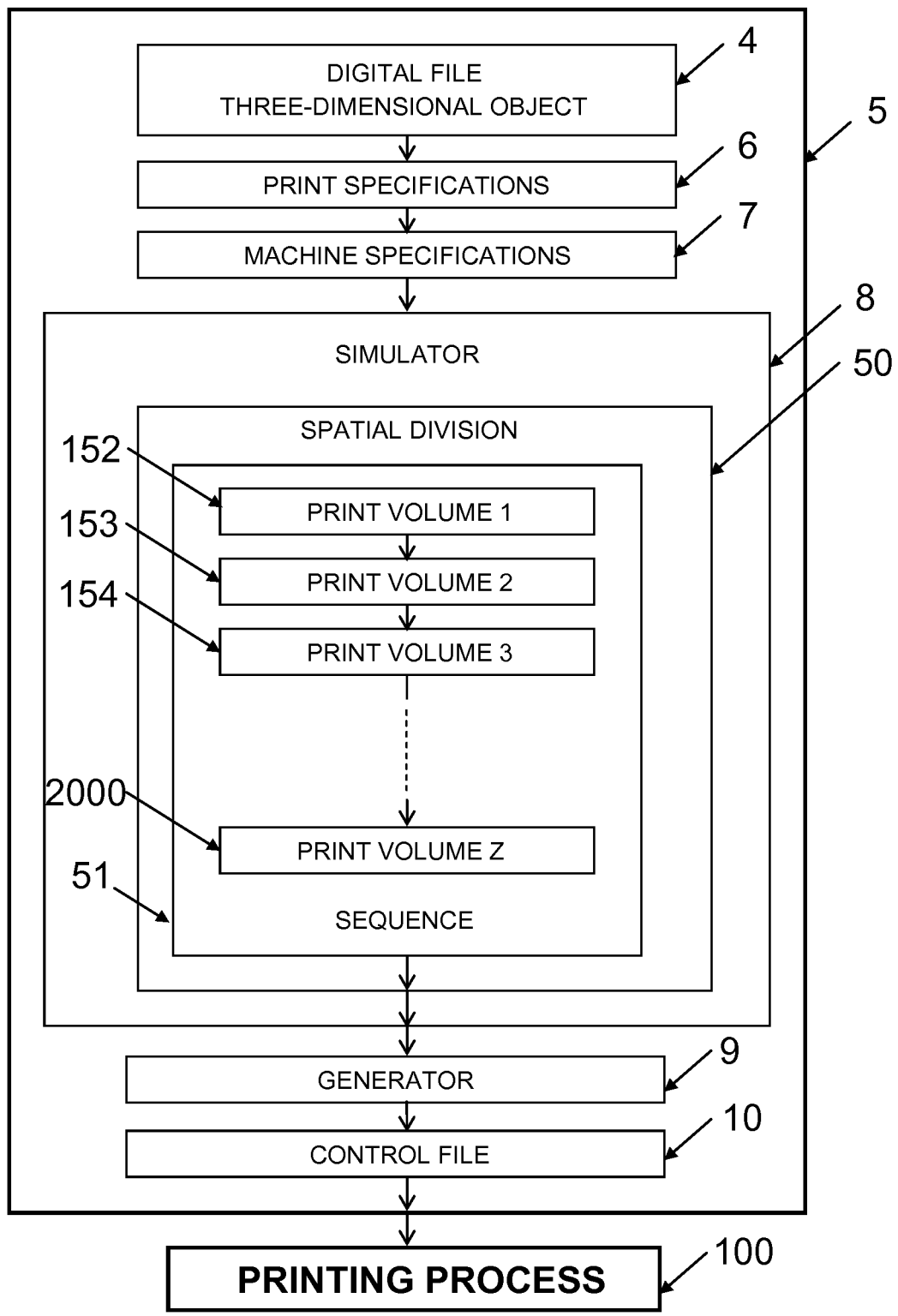
Figure 14:
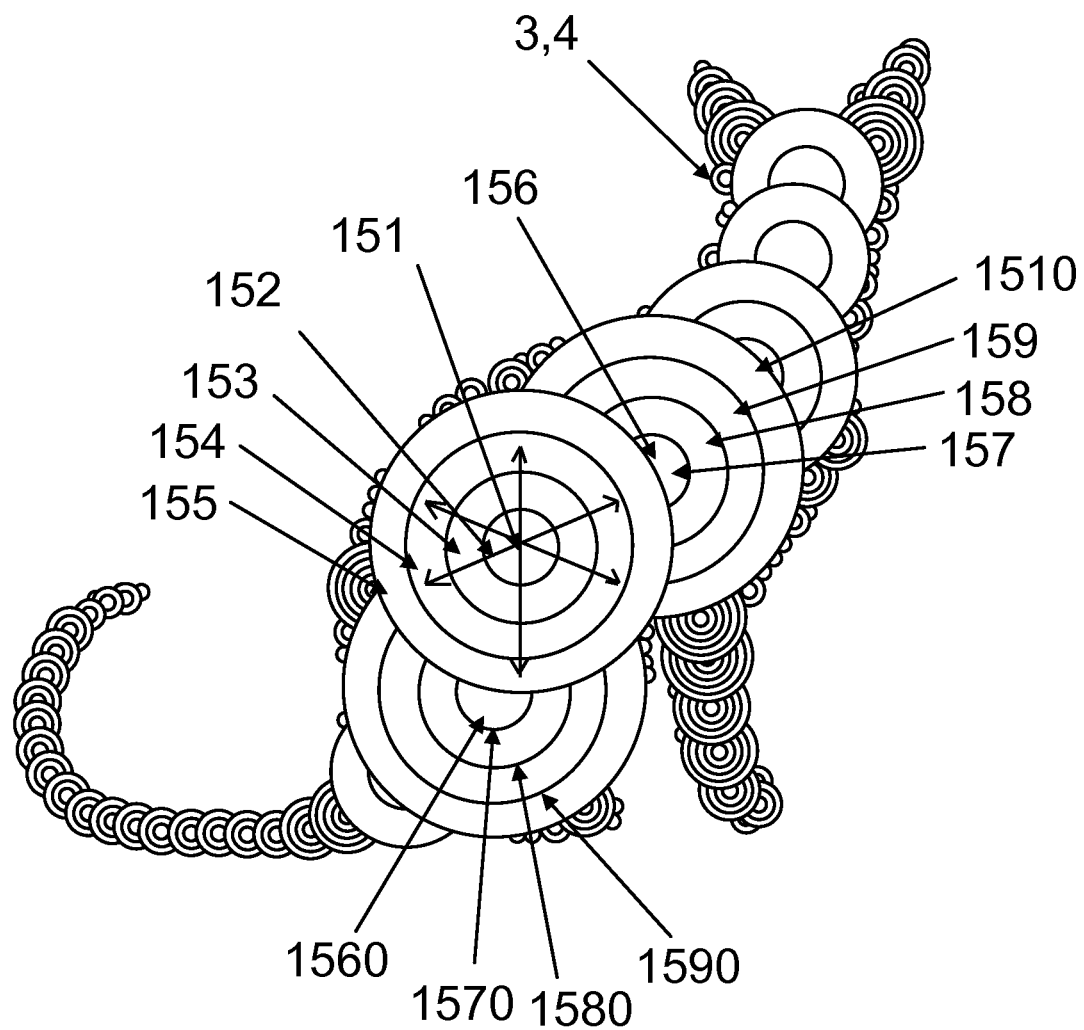
Figure 15:
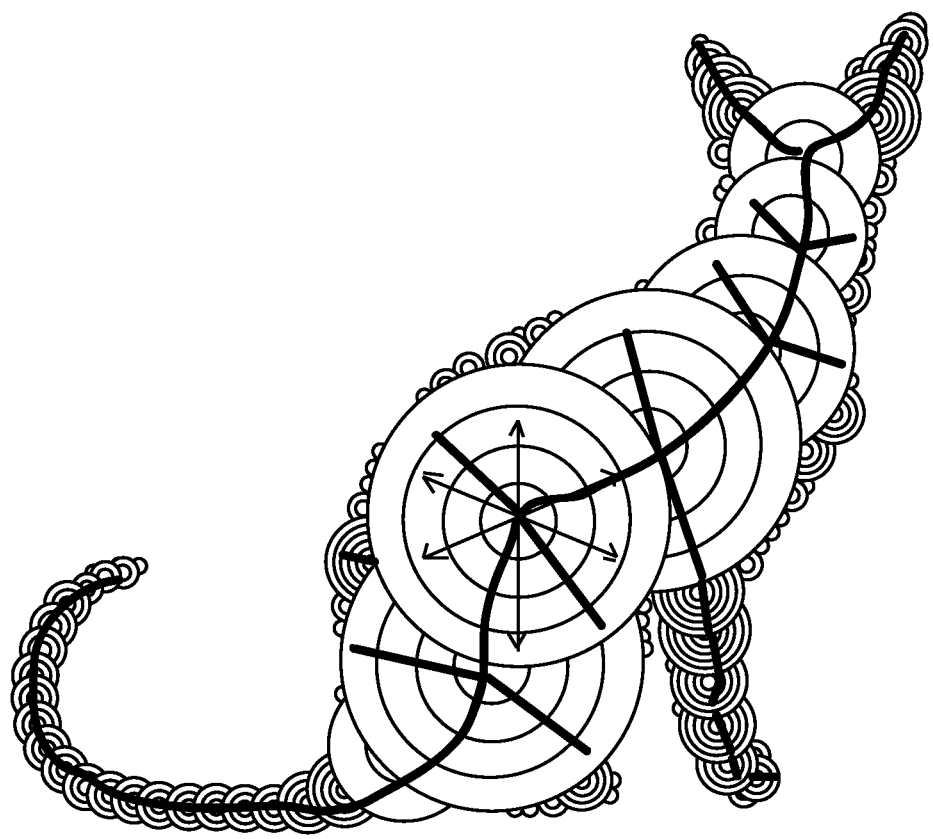
Figure 16:
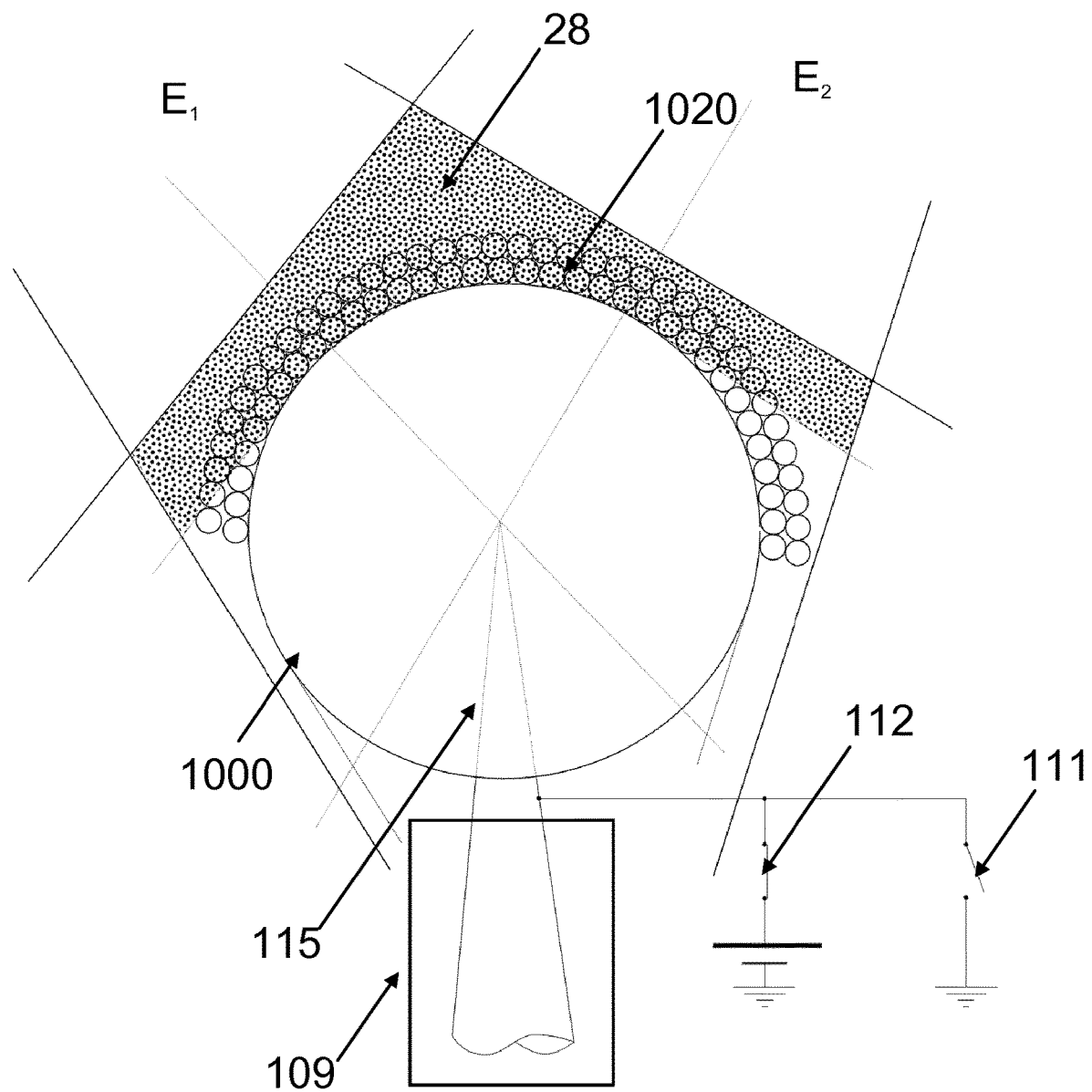

FIG. 1 depicts an example embodiment of the basic principle of method and machine operation comprising two particle sources emitting particle clusters which arrive into the area surrounding the intersection point of geometrical axes of said particle sources simultaneously and create a specific intersection volume in this way;

FIG. 2 depicts the influence of a time delay between particle clusters emitted from the first and the second particle source on the location, the shape and the sum of particle density the intersection volume;

FIG. 3 depicts the influence of enlargement of individual particle clusters on the size of the intersection volume by prolonging the duration of pulses and making the divergence larger;

FIG. 4 depicts the influence of changing the divergence of particle sources and changing the angle between the geometrical axes of particle sources on the intersection volume which is assembled from a plurality of smaller intersection volumes in this example;

FIG. 5 depicts an example embodiment of the basic principle of method and machine operation comprising two particle sources emitting particle clusters which move one towards the other and the angle between the geometrical axes of said particle sources is 180 degrees;

FIG. 6 depicts an example embodiment of the basic principle of method and machine operation comprising six particle sources arranged in pairs so that particles emitted within an individual pair of particle sources travel move towards each other and the angle between the geometrical axes of particle sources in an individual pair is 180 degrees. Individual pairs are arranged so that all geometrical axes of said sources intersect in one point;

FIG. 7 depicts an example embodiment of the machine comprising two particle sources, a system for magnetic levitation of powdered material, a system for electrostatic pull of powdered material, and a support system for the object which is being fabricated;

FIG. 8 depicts an example embodiment of the machine comprising two particle sources and a system for magnetic levitation of the powdered material and wherein particle sources are arranged so that the axes of the beams lay in a plane which is perpendicular to the geometrical axes of the windings;

FIG. 9 depicts an example embodiment of the machine for additive manufacturing of three-dimensional objects comprising three independent pulsating particle sources, a system for magnetic levitation of powdered material and three independent linear mechanisations for particle sources;

FIG. 10 depicts an example embodiment of the machine for additive manufacturing of objects comprising three independent pulsating particle sources, a system for magnetic levitation of powdered material, and a circular mechanisation for one of the particle sources;

FIG. 11 depicts an example embodiment of the machine for additive manufacturing of objects comprising four independent pulsating particle sources, a system for magnetic levitation of powdered material and a system for dosing of the powdered material wherein depicted example embodiment of the machine exhibits the geometry of a tetrahedron;

FIG. 12 shows an example embodiment of the machine for additive manufacturing of objects comprising six independent pulsating particle sources, a system for magnetic levitation of powdered material and a system for dosing of the powdered material wherein depicted example embodiment of the machine exhibits cubic geometry;

FIG. 13 depicts a schematic view of the flowchart of the method for additive manufacturing according to the present invention;

FIG. 14 depicts a schematic view of the cross section of an exemplary object which is being fabricated and the spatial division of such an object into a sequence of individual print volumes, which are spheres and shells in this example. Such an example of spatial division can be achieved using an example embodiment of the machine comprising six particle sources. In the depicted example the melting volume exhibits a shape similar to a sphere or a shell. Subsequent print volumes are also depicted;

FIG. 15 depicts an example of spatial division of an exemplary object into a sequence of print volumes with a schematic depiction of main possible simultaneous printing directions;

FIG. 16 shows the principle of adding the powdered material onto the already printed part of the object with the use of two particle beams and a system for electrostatic pull of the powdered material onto the surface of the already printed object part.

DETAILED DESCRIPTION OF INVENTION

Various embodiments of the present invention will now be described more fully hereinafter with reference to the accompanying drawings, in which some, but not all embodiments of the invention are shown. Indeed, the embodiments of the invention may be embodied in many different forms and should not be considered as limited to the embodiments set forth herein. Rather, these embodiments are provided so that this disclosure will satisfy applicable legal requirements.

FIG. 1 depicts the basic principle of method and machine operation according to the present invention in an example embodiment wherein particles used for melting material for the purpose of fabricating a three-dimensional object are electrons. FIG. 1 shows a part of the machine according to the present invention and comprising a first particle source 11 and a second particle source 12 which are both emitting electrons therefore said particle sources 11, 12 are electron beamforming guns in this example. Particle source 11 emits a particle beam $E_1$ in the direction of a geometrical axis 13 of said particle source 11. Particle source 12 emits a particle beam $E_2$ in the direction of a geometrical axis 14 of said particle source 12. Particle source 11 is equipped with a system of magnetic lenses 18 used for shaping a radius $r_1$, a divergence a, and a deflection of the beam $E_1$ with respect to the direction of the geometrical axis 13. Particle source 12 is equipped with a system of magnetic lenses 19 used for shaping a radius $r_2$, a divergence 13, and a deflection of the beam $E_2$ with respect to the direction of the geometrical axis 14. Geometrical axis 13 of particle source 11 and geometrical axis 14 of particle source 12 are spatially arranged at an angle $\Omega_1$ with respect to each other and intersect in the intersection point 15. Particle source 11 is controlled with a control unit CT 1 to where the machine sends a control signal CTRL 1, and particle source 12 is controlled with a control unit CT 2 to where the machine sends a control signal CTRL 2.

The control signals CTRL 1, CTRL 2 controlling particle sources 11, 12 are synchronised in a timely manner and in this example embodiment exhibit no time delay between clusters emitted from the first particle source 11 and clusters emitted from the second particle source 12. Particle source 11 emits a cluster series 16 produced by pulsating of the particle sources 11 in time. Particle source 12 emits a cluster series 17 created by pulsating of the particle sources 12 in time. The intensity of cluster series 16 or the number of particles going through an imaginary surface S in a unit of time (i.e. the flux), respectfully is either constant in time or changing in time. FIG. 1 depicts an example embodiment where the flux of particles is changing in time from the value zero j=0 to a certain arbitrary value j determined by the density of particles $g_1$ and their travel speed $v_1$. Changing of the flux of particles can be either periodical in time or it can have any other predefined time dependency. In this way the emission of pulses or (better said) cluster series 16, 17, respectfully is achieved from particle sources 11, 12 wherein said cluster series 16, 17 comprise a plurality of individual particle clusters following one another at a predefined time intervals. Individual particle clusters in cluster series 16 have travel speeds $v_1$, lengths $L_1$, and follow one another at distances $D_1$ which are lengths of the volumetric parts with no particles. Individual particle clusters in cluster series 17 have travel speeds $v_2$, lengths $L_2$, and follow one another at distances $D_2$ which are lengths of volumetric parts with no particles. The length $L_1$ of an individual particle cluster in cluster series 16 is defined by the duration of emission of particles from the particle source and by particle's travel speed $v_1$. The length $L_2$ of individual cluster in cluster series 17 is defined by the duration of emission of particles from the particle source 12 and by particle's travel speed $v_2$. All assembly parts and parameters for operating the particle sources 11, 12 include but are not limited to: pulsating, therefore creation of lengths $L_1$, $L_2$ and distances $D_1$, $D_2$; defining the particle travel speeds $v_1$, $v_2$ by manipulation of particle acceleration voltages $U_1$, $U_2$ in particle sources 11, 12; defining particle flux $j_1$, $j_2$; controlling the divergences α, β and the deflections of beams $E_1$, $E_2$ using systems of magnetic lenses 18, 19.

Furthermore FIG. 1 shows instantaneous depiction of two particle sources 11, 12 emitting cluster series 16, 17 in the direction of geometrical axes 13, 14 of said sources 11, 12 in which said cluster series 16, 17 are mutually arranged spatially and in a timely manner so that two predefined particle clusters, which are emitted from different particle sources 11, 12, arrive and overlap in a volumetric part surrounding the intersection point 15 of said geometrical axes 13, 14 at the same time. It is evident that traveling clusters in the cluster series 16 and 17 enable the creation of a sum g of particle densities in an intersection volume 28 of beams $E_1$, $E_2$ at a specifically predefined time interval during which the densities $g_1$, $g_2$ of particle clusters assembling beams $E_1$, $E_2$ overlap. FIG. 1 illustrates an example embodiment of basic principle of method and machine operation at the moment in which the sum g of particle densities $g_1$, $g_2$ in the intersection volume 28 is at maximum value. The addition of particle densities in the intersection volume 28 will continue in time and will be repeating by overlapping of sequential two particle clusters having lengths $L_1$, $L_2$ and distances $D_1$, $D_2$ in between them. A spatially localised sum of particle flux $j=j_1 \cdot j_2$ which is pulsating in time is created in such a way. Individual clusters in cluster series 16 exhibit a velocity vector $\vec{v}_1$, and individual clusters in cluster series 17 exhibit a velocity vector $\vec{v}_2$; consequently the intersection volume 28 exhibits a velocity vector $\vec{v}_1$, which is equal to the vector sum of velocity vectors $\vec{v}_1$, and $\vec{v}_2$. In the case where said velocity vectors $\vec{v}_1$, and $\vec{v}_2$ are equal in speed and individual clusters from both cluster series 16, 17 have the same particle flux ($j_1=j_2$), the direction of the intersection volume 28 creation is in the direction of the line of symmetry between beam $E_1$ and beam $E_2$.

Hereinafter describing FIG. 1 it is explained that during the printing process 100 (FIG. 13) using a machine 1 a powdered material 102 (FIG. 7), which is intended to melt, is added and particle sources 11, 12 start emitting particles causing the spatially localised sum g (FIG. 1, indicated region) of particle densities $g_1$, $g_2$ in the intersection volume 28. Due to the sum g of densities ($g_1+g_2$) of both beams $E_1$, $E_2$ emitted from particle sources 11, 12, the kinetic energy density in a part of the intersection volume 28 is high enough to overcome the energy threshold required to melt the powdered material being located in the melting volume 280 during the time interval during which the clusters of electrons overlap. During the collision of particles emitted from sources 11, 12 with powdered material 102 the particles transfer their kinetic energy into heat and therefore cause the powdered material to melt in a part the intersection volume 28 which is noted as melting volume 280.

An example embodiment of the basic principle of operation of the machine and the method as shown in FIG. 2 depicts the influence of a time delay $t_f$ between a cluster series 16 emitted from particle source 11 and a cluster series 17 emitted from a particle source 12. FIG. 2 shows two spatially positioned particle sources 11, 12 which are both equipped with its own system of magnetic lenses 18, 19 and which are both emitting appropriately shaped and pulsating particle beams $E_1$, $E_2$ in the direction of geometrical axes 13, 14 of said particle sources 11, 12. Geometrical axes 13, 14 of particle sources 11, 12 intersect at the intersection point 15. Particle source 11 is pulsating in time and produces the particle beam $E_1$ comprising cluster series 16 comprising individual clusters 160, 161, 162, 163, 164 with distances $D_1$ in between them. Particle source 12 is pulsating in time, and produces the particle beam $E_2$ comprising cluster series 17 comprising individual clusters 170, 171, 172, 173, 174 with distances $D_2$ in between them. In this example length $L_1$ is equal to length $L_2$, and particle travel speed $v_1$ is equal to $v_2$. Cluster series 16 emitted from particle source 11 is time delayed with respect to the cluster series 17 emitted from particle source 12, so that individual clusters 160, 161, 162, 163, 164 are arriving at the intersection point 15 with a time delay $t_f$ (phase shift) with respect to the arrival of particle clusters 170, 171, 172, 173, 174 emitted from particle source 12. The time delay $t_f$ consequently causes a spatial offset AD. Delaying cluster series 16 against cluster series 17 with a time delay $t_f$ significantly influences the sum g of particle densities in the intersection volume 28 of particle beams $E_1$, $E_2$. Shown in FIG. 2 is the instantaneous picture of the cluster series 16, 17 overlapping at a specific moment, and the current intersection volume is marked.

A spatial offset of cluster series 17 with respect to cluster series 16 is achieved using the time delay $t_f$ and results in a travel path difference which influences the position and the shape of the intersection volume 28 of beams $E_1$, $E_2$ and which causes said intersection volume 28 to be spatially offset in a direction outwards from the intersection point 15.

Furthermore it is claimed that with the use of time delays $t_f$ between individual clusters such as 160, 170 in series 16, 17 and with the use of controlled divergence α, β of beams $E_1$, $E_2$, a travel direction of the intersection volume 28 can be manipulated. As shown in FIG. 1, the travel speed and direction of the local particle density g maximum in the intersection volume 28 is equal to the vector sum of velocity vectors $\vec{v}_1+\vec{v}_2$ of the travelling individual clusters 160, 170 in series 16, 17.

The position and the shape of the intersection volume 28 can be additionally manipulated with systems of magnetic lenses 18, 19 of particle sources 11, 12. Systems of magnetic lenses 18, 19 are therefore used for controlling the divergences α, β and the deflections of the beams $E_1$, $E_2$. Although the deflection represents a constituent part of the machine and method operation according to the disclosed invention, the deflection of beams $E_1$, $E_2$ is not separately depicted in any of the FIG. due to the complexity of this application.

FIG. 3 depicts an example embodiment of the basic principle of operation of the machine and the method wherein the individual particle clusters assembling series 16, 17 emitted from particle sources 11, 12 are longer and wider than those shown in FIG. 1 and FIG. 2. In this example embodiment it is therefore considered that: a length $L_3$ of an individual clusters in series 16 is longer than the length $L_1$ depicted in FIG. 1, the divergence $α_1$ is wider that the divergence α depicted in FIG. 1, a diameter $r_3$ (FIG. 3) of beam $E_1$ is wider than the radius $r_1$ depicted in FIG. 1, a length $L_4$ (FIG. 4) of clusters in series 17 is longer than the length $L_2$ depicted in FIG. 1, the divergence $β_1$ is wider that the divergence β in FIG. 1, and a diameter $r_4$ (FIG. 3) of beam $E_2$ is wider than the radius $r_2$ depicted in FIG. 1 ($L_3>L_1$, $L_4>L_1$, $\alpha_1>\alpha$, $\beta_1>\beta$, $r_3>r_1$ and $r_4>r_2$.)

Parts of control signals CTRL 1 and CTRL 2 which control the accelerating voltage $U_1$, $U_2$ (FIG. 3) and result in the emission of individual clusters with specific lengths L in cluster series 16,17 emitted from particle sources 11,12 are pulsating. In FIG. 3 said pulsating parts of control signals CTRL 1, CTRL 2 are implemented with the use of longer pulses than in the example embodiment shown in FIG. 1. The divergences $\alpha_1$, $\beta_1$ are controlled by another dedicated parts of control signals CTRL 1, CTRL 2 for determining divergence $\alpha$, $\beta$, and are larger in the example depicted in FIG. 3 than divergences $\alpha$, $\beta$ depicted in FIG. 1. In this way, the intersection volume 28 of particle clusters is spatially enlarged but it remains located in the centre (meaning its central point is coinciding with the intersection point 15) because there is no time delay $t_f$ between the cluster series 16 and 17 in this example embodiment.

The length of the intersection volume 28 in the direction of geometrical axes 13, 14 can be increased with the use of prolongation of the duration of individual pulses (lowering the frequency of pulsation) within dedicated parts of control signals CTRL 1, CTRL 2 which control the accelerating voltage $U_1$, $U_2$, and with which the emission of series 16, 17 comprising clusters of lengths $L_1$, $L_2$ is achieved. With the use of gradual increase of divergences $\alpha$, $\beta$ a wider melting volume 280 can be achieved in the direction perpendicular to geometrical axes 13, 14. The melting volume 280 is a three-dimensional part of the intersection volume 28 defined as the volumetric part in which the applied kinetic energy is above the energy threshold required for melting of the material and where said energy therefore causes the melting of the powdered material 102 (FIG. 7). Melting volume 280 and intersection volume 28 are separately noted because it is possible that not all of the volumetric parts of the intersection volume 28 will suffice the energy conditions necessary to melt the powdered material 102 (FIG. 7), but for the purpose of description of the present invention, the term intersection volume 28 is generally used with an intention to describe the melting volume 280. Shown in FIG. 3 is a melting volume 280 which is of the same size as the intersection volume 28. When lengths L are increased, said lengths L being those of individual clusters in cluster series 16, 17 emitted from plurality of particle sources 11, 12, the total applied energy in the intersection volume 28 is increased at the same time. The size of the melting volume 280 (indicated region 280) can be precisely set in a controlled manner by way of appropriating the lengths L of individual clusters in cluster series 16, 17 or by appropriating the divergences $\alpha$, $\beta$ of the particle beams $E_1$, $E_2$. The divergences $\alpha$, $\beta$ of particle beams $E_1$, $E_2$ are controlled using systems of magnetic lenses 18, 19 which are controlled by dedicated parts of control signals CTRL 1, CTRL 2 via control units CT 1, CT 2. Control signals CTRL 1, CTRL 2 are therefore assembled from said different parts of control signals, which individually contain synchronized controls expressed as time functions and are used for managing all constituent parts of particle sources 11, 12 at a desired time during the printing process, said parts of control signals CTRL 1, CTRL 2 therefore contain time-adjusted controls for managing the divergence $\alpha$, $\beta$, the deflection, particle vector velocities $\vec{v}_1$, $\vec{v}_2$, particle densities $g_1$, $g_2$ and particle acceleration voltages $U_1$, $U_2$ used for creation of particle clusters.

Hereinafter it is explained how the angle $\Omega_1$ between the geometrical axes 13,14 of two particle sources 11,12 influences a shape, a development of the shape and a travel direction of the intersection volume 28 in time. For reasons of clarity, FIG. 4 depicts an example embodiment of the basic principle of operation of the machine and the method comprising two pulsating particle sources 11, 12 placed on a common plane (plane of the FIG.) and in which the angle $\Omega_1$ between the geometrical axis 13,14 of particle source 11,12 is in this case $\Omega_1<90$ degrees.

FIG. 4 shows two particle sources 11, 12 emitting cluster series 16, 17 which are synchronized and without any time delay $t_f$ amongst them. Both beams $E_1$, $E_2$ are made divergent by a certain amount using the systems of magnetic lenses 18, 19 so that they are widened in the volumetric parts surrounding the intersection point 15. It is evident from FIG. 4 that the intersection volume 28 of particle beams $E_1$, $E_2$ is divided into a plurality of smaller intersection volumes consecutively numbered with 45, 46, 47, 48, 49, and 410 in this case. Because cluster series 16 and 17 travel with vector velocities $\vec{v}_1$ and $\vec{v}_2$ and the angle Z between their geometrical axes 13, 14 is present as is, it is evident from FIG. 4 that the intersection volume 28 and its smaller constituent intersection volumes 45, 46, 47, 48, 49 and 410 will travel with a vector velocity $\vec{v}$ in the direction of the line of symmetry between the geometrical axes 13, 14. At any given moment a plurality of smaller constituent intersection volumes 45, 46, 47, 48, 49, 410 which travel in the direction of the vector sum $\vec{v}$ being a sum of individual vector velocities $\vec{v}_1$, $\vec{v}_2$ can be achieved.

In the case of applying a time delay $t_f$ between at least two appropriately pulsating particle beams $E_1$, $E_2$, which have the same pulsating frequency (meaning that the length $L_1$ is equal to length $L_2$ and the distance $D_1$ is equal to distance $D_2$), the vector velocity $\vec{v}$ of smaller constituent intersection volumes 45, 46, 47, 48, 49, 410 can be modified in an arbitrary direction outward from the line of symmetry between geometrical axes 13 and 14. Furthermore it is claimed that the direction of velocity vector $\vec{v}$ of smaller constituent intersection volumes 45, 46, 47, 48, 49, 410 can be manipulated by modifying the particle flux $j_1$ and $j_2$ emitted from particle sources 11 12.

Individual smaller constituent intersection volumes 45, 46, 47, 48, 49, 410 as depicted in FIG. 4, can exhibit the shape of elongated, flattened, three-axial ellipsoids. A maximum length A of a smaller constituent intersection volume 48 is determined by lengths $L_1$, $L_2$ of individual particle clusters 160, 170, which overlap at an angle $\Omega_1$ in this example. A Maximum width B is the width of a smaller constituent intersection volume 48 and is determined with transverse overlapping of the beams $E_1$, $E_2$ emitted from two particle sources 11, 12 at an angle $\Omega_1$. The maximum of width B depends on the amount of divergence $\alpha$, $\beta$ which defines the maximum radii $r_1$, $r_2$ of particle clusters 160, 170 overlapping under the angle $\Omega_1$ at a specific moment t and in this way create said smaller constituent intersection volume 48 in this case. The height or the third axis of such an ellipsoid 48, respectfully is not visible herein, is directed into depth of the image, and is also determined by the angle $\Omega_1$, divergence $\alpha$, $\beta$, and lengths $L_1$, $L_2$.

The shape of such individual smaller constituent intersection volumes 45, 46, 47, 48, 49, 410, which altogether constitute the total intersection volume 28, is depicted in FIG. 4 as being similar to ellipsoids, and is uniquely determined with divergences $\alpha$, $\beta$ of particle beams $E_1$, $E_2$, the angle $\Omega_1$ between geometrical axes 13, 14 of particle sources 11, 12, and the shape of controls in the parts of control signals CTRL 1, CTRL 2 which determine the pulsating of beams $E_1$, $E_2$ via acceleration voltage $U_1$, $U_2$ on the particle sources 11, 12 during time t and consequently create the individual clusters 160, 170 in cluster series 16, 17 and which have predetermined lengths $L_1$, $L_2$. The mentioned parts of control signals CTRL 1, CTRL 2 can exhibit the shape of different time functions (sinusoidal, square wave or any other shape). FIGS. 1, 2 and 3 depict example embodiments wherein said parts of control signals CTRL 1, CTRL 2 which determine the pulsating of particle sources 11, 12, exhibit the shape of square wave functions of time, whilst in the FIG. 4 this shape is a sinusoid.

Hereinafter described is an example embodiment as depicted in FIG. 5. FIG. 5 is showing an instantaneous image of two cluster series 16, 17 emitted from two particle sources 11, 12 which are positioned so that they emit individual clusters 160, 170 of equal lengths ($L_1=L_2$) in the direction one towards the other, so that the angle $\Omega$ is 180 degrees and wherein said angle $\Omega$ is the angle between the geometrical axes 13, 14 of said sources 11, 12. Cluster series 16, 17 are synchronised amongst themselves and have no time delay $t_f$ applied between them, meaning that an individual particle cluster 160 in cluster series 16 emitted from particle source 11 and an individual particle cluster 170 in cluster series 17 emitted from particle source 12 both arrive to the volumetric part surrounding the intersection point 15 at the same time. A distance 20 marks the distance from particle source 11 to the intersection point 15 and a distance 21 marks the distance from particle source 12 to the intersection point 15. If the distance 20 is not the same as distance 21, the synchronous arrival of individual clusters 160, 170 can be achieved with appropriate time delay $t_f$ which can be used to compensate for the difference between the distances 20 and 12 or a difference between the travel speeds $v_1$ and $v_2$. In such an example embodiment as evident from FIG. 5, the the shape of the intersection volume 28 can be similar to a cylinder during the entire time in which clusters overlap, if the individual clusters 160, 170 which overlap are of cylindrical shape. The length of such a cylindrically shaped intersection volume 28 will change during the time in which clusters overlap, with the maximum length of such an intersection volume 28 being the same as lengths $L_1$, $L_2$ of individual clusters 160, 170 which create such an intersection volume 28. The cross section of individual particle clusters 160, 170 is round in this example embodiment; therefore the depicted intersection volume 28 is a cylinder with a radius $r_1$.

Using appropriate modulation of intensities of fluxes $j_1$, $j_2$ or divergences $\alpha$, $\beta$ it can be achieved so that the individual clusters 160, 170 are of any other shape; instead of cylindrical volume of clusters 160, 170, the individual clusters 160, 170 can be shaped for example as a half of a sinusoid wave as shown in FIG. 4, or in any other predefined way. For reasons of clarity in depicting the intersection volume 28, shown in FIG. 1-3 and FIG. 5 is the use of parts of control signals for pulsating which are shaped as a square wave function whilst the divergences $\alpha$, $\beta$ are not changed during pulsating, because in this way it is easier to depict the limits between high and low densities of particles. But in a case where parts of control signals for pulsating shaped as a sinusoid function are used, the intersection volume 28 of two clusters shaped as a sinusoid and travelling toward each other will be shaped as a rotationally symmetrical object in the shape of a tactoid. A cross-section of such a tactoid is a circle. If a sinusoid function is used at the same time also for the modulation of divergences $\alpha$, $\beta$ than individual clusters 160,170 can be of a spherical shape and therefore the intersection volume 28 of such a plurality of clusters can also be shaped as a sphere.

From FIG. 5 it is also easier to imagine the location of the intersection volume 28 (FIG. 1-3) in the case where individual clusters 160, 170 emitted from particle sources 11, 12 and which overlap in the intersection volume 28, are time delayed. If cluster series 16 emitted from particle source 11 will be travelling ahead of the cluster series 17 emitted from particle source 12 and the distance 20 of particle source 11 to the intersection point 15 is the same as the distance 21 of particle source 12, then particle series 16, 17 will be overlapping in a volumetric part which is closer to the particle source 12. An individual cluster 160 in cluster series 16 will travel ahead and already pass by the intersection point 15 whilst at the same an individual cluster 170 in cluster series 17 will not arrive at the intersection point 15 yet. Location of an intersection volume 28 can therefore be determined with the use of predefined time delays $t_f$ applied amongst individual clusters 160, 170 in cluster series 16, 17 emitted from two separate particle sources 11, 12.

FIG. 6 depicts an example embodiment comprising six particle sources 11, 12, 61, 62, 63, 64 which are spatially arranged so that they create 3 pairs of particle sources. In each pair the individual constituent particle sources are directed towards each other (facing each other), and the said pairs being: the first pair comprising particle sources 11 and 12, the second pair comprising particle sources 61 and 62, and the third pair comprising particle sources 63 and 64. Said particle sources are managed by control signals CTRL 1, CTRL 2, CTRL 3, CTRL 4, CTRL 5, CTRL 6 via control units CT 1, CT 2, CT 3, CT 4, CT 5, CT 6. The control units CT 1, CT 2, CT 3, CT 4, CT 5, CT 6 manage the particle sources 11, 12, 61, 62, 63, 64 according to the control signals and therefore control parameters such as the lengths $L_1$, $L_2$, $L_3$, $L_4$, $L_5$, $L_6$ of individual clusters of particles, the time delay $t_f$, divergences $\alpha_1$-$\alpha_6$, energy determined by means of acceleration voltage $U_1$, $U_2$, $U_3$, $U_4$, $U_5$, $U_6$, vector velocities $v_1$, $v_2$, $v_3$, $v_4$, $v_5$, $v_6$, and densities g.

Shown in FIG. 6 are 3 pairs of particle sources which are mutually arranged so that all of the geometrical axes of said sources intersect in a single intersection point 15 and that geometrical axes of pairs of particle sources intersect at angles $\Omega_1$, $\Omega_2$, and $\Omega_3$. All particle sources 11, 12, 61, 62, 63, 64 are individually equipped with systems of magnetic lenses 18, 19, 69, 70, 71, 72, are synchronized amongst themselves, and are emitting cluster series 16, 17, 65, 66, 67, 68 simultaneously in the direction of velocity vectors $\vec{v}_1$, $\vec{v}_2$, $\vec{v}_3$, $\vec{v}_4$, $\vec{v}_5$, $\vec{v}_6$, so that each particle source is emitting cluster series towards the other particle source in each pair of particle sources. Therefore, in the first pair of particle sources the particle source 11 is emitting cluster series 16 in the direction towards the opposite particle source 12 and said particle source 12 is emitting cluster series 17 towards the particle source 11, which is causing said cluster series 16 and 17 to travel towards each other. Similarly, in the second pair of particle sources the particle source 61 is emitting cluster series 65 towards the particle source 62 and said particle source 62 is emitting cluster series 66 towards the particle source 61, which is causing said cluster series 65 and 66 to travel towards each other. Similarly, in the third pair of particle sources the particle source 63 is emitting cluster series 68 towards the particle source 64, and the particle source 64 emitting cluster series 67 towards the particle source 63, which is causing said cluster series 67 and 68 to travel towards each other.

Predefined particle clusters in cluster series 16, 17, 65, 66, 67, 68 arrive simultaneously into volumetric parts surrounding the intersection point 15, which is equally separated from all six particle sources 11, 12, 61, 62, 63, 64. In the example embodiment pictured in FIG. 6 the divergences of beams emitted from particle sources 11, 12, 61, 62, 63, 64 are the same, furthermore it is claimed that said divergences can be different. Furthermore it is claimed that the deflections can be different wherein said deflections are the one of different beams emitted from particle sources 11, 12, 61, 62, 63, 64 and are caused by systems of magnetic lenses 18, 19, 69, 70, 71, 72.

It is clear that in an example embodiment where appropriately shaped control signals are used, the intersection volume 28 of all cluster series 16, 17, 65, 66, 67, 68 can be a sphere with the diameter 2R and the centre in the intersection point 15. It is claimed that the diameter 2R of the intersection volume 28 can be changed by manipulation of those parts of control signals CTRL 1-6 which determine divergences $\alpha_1$-$\alpha_6$ and the shape of pulsating of the individual beams emitted from particle sources 11, 12, 61, 62, 63, 64. In the example embodiment as shown in FIG. 6 pulses in the shape a square wave are used for pulsating of said beams and the intersection volume 28 is shaped somewhere in-between a sphere and a cube, similar to a sphere. Furthermore, in an example embodiment shown in FIG. 6, the spatial symmetry of the intersection volume 28 in all the directions of vector velocities $\vec{v}_1$, $\vec{v}_2$, $\vec{v}_3$, $\vec{v}_4$, $\vec{v}_5$, $\vec{v}_6$ outwards from the intersection point 15 is clearly depicted. Furthermore, it is claimed that example embodiments of the basic principle of machine and method of operation are possible wherein geometrical axes of plurality of particle sources, for example particle sources 11, 12, 61, 62, 63, 64, intersect in a plurality of intersection points in space. Furthermore, it is claimed that example embodiments of the machine and the method are possible in which geometrical axes of plurality of particle sources such as 11, 12, 61, 62, 63, 64 intersect at different angles $\Omega$ which can also change during the printing process.

DESCRIPTION OF EMBODIMENTS

Hereinafter based on the FIG. 7, 8, 9, 10, 11, 12 some example embodiments of the machine for additive manufacturing of three-dimensional objects will be described in detail.

FIG. 7 depicts an example embodiment of the machine for additive manufacturing of three-dimensional objects comprising two particle sources 11, 12 which are spatially arranged so that their geometrical axes 13, 14 intersect at the intersection point 15. The machine is equipped with two windings 105, 106 individually carrying an electric current I used for creation of a magnetic field B. Windings 105 and 106 have a common geometrical axis 107. Windings 105, 106 are each individually connected to control units CT B1, CT B2 controlled by control signals CTRL B1, CTRL B2. In a machine printing space 2 the time-varying and spatially non-homogenous magnetic field B can be achieved using the windings 105, 106 so that magnetic levitation and transport of powdered material 102 is achieved using the magnetic force into a pre-determined position in the intersection volume 28 where powdered material 102 melts during the printing process 100 (FIG. 13) used for fabricating a predefined, three-dimensional object, such as an object 3. Printing space 2 of the machine 1 is the largest area inside machine 1 where it is possible to transport and melt the powdered material 102 and therefore marks the entire space inside a vacuum chamber 116 where fabrication is possible.

Control units CT 1, CT 2 are controlled by control signals CTRL 1, CTRL 2 and are used to manage the parameters of beams $E_1$, $E_2$ emitted from particle sources 11, 12. A control signal CTRL B1 via a control unit CT B1 and a control signal CTRL B2 via a control unit CT B2 determine amplitudes and directions of electrical currents I running through windings 105, 106 during the printing process 100 (FIG. 13) for the purpose of transporting the powdered material 102 into the melting volume 280 (FIG. 3). An appropriate magnetic field B, which assures the transport of powdered material 102 into the desired part within the intersection volume 28, is achieved by alternating the direction or modulating amplitudes or phases of the electrical currents I running through windings 105, 106.

Powdered material 102, which is used for fabrication of a three-dimensional object such as object 3 (FIG. 14) during the printing process 100 (FIG. 100), is kept in a container 101 (FIG. 7) before the printing process 100. Dosing of the powdered material 102 (FIG. 7) is managed by the stopper 103 positioned on the exit of the container 101. The opening and closing of the stopper 103 is controlled with a control signal CTRL C1 via control unit CT C1 during the printing process 100 (FIG. 13) thus enabling a predetermined amount of the powdered material 102 to be added in this way. The windings 105, 106 creating the magnetic field B can be located either inside or outside of a vacuum chamber 116. The support of an already printed object part, such as 1000 (FIG. 16), is performed using a hollow cylinder or a support stick 109, respectfully, which is made from material with extremely high melting temperature or a material the melting point of which is significantly higher than the melting point of the powdered material 102 (FIG. 7) used for fabrication of an object, for example object 3 (FIG. 14), respectfully. An electrically conductive needle 115 is placed in the centre of the support stick 109 and is reaching up to the intersection point 15 (FIG. 7) on one side, and on the other side the conductive needle 115 is connected to a switch 111, a switch 112, and a switch 113 which are operated with a control signal CTRL F1 via a control unit CT F1. The switch 111 grounds the conductive needle 115 during the removal of excessive, charged particles, the switch 112 connects the conductive needle 115 to a higher electric potential $W_1(+)$ than the electrical potential of particle sources 11,12, and the switch 113 connects the conductive needle to a lower electric potential $W_2(-)$ than the electrical potential of particle sources 11,12. The conductive needle 115 and particle sources 11, 12 create a full electrical circuit which connects through either a vacuum or an environment similar to a vacuum in a vacuum chamber 116, said conductive needle 115 can therefore remove the negative or the positive electrical charge of particles which can accumulate on the fabricated object's surface and transfer said charge onto the conductive needle 115. The conductive needle 115, which is placed in the centre of the support stick 109, is connected electrically to the surface of an already printed object part, such as an already printed object part 1000 depicted in FIG. 16, during addition of powdered material. When such an exemplary already printed object part 1000 becomes larger during the printing process 100 (FIG. 13) and if required, a mechanisation 114 (FIG. 7) of the outer support stick 109 enables said support stick 109 to be moved away from such an already printed object part 1000 just enough, so that said support stick 109 can still mechanically support the already printed object part 1000 (FIG. 16) in the given example. The mechanisation 114 as depicted in FIG.

7 is managed by a control unit CT Dl with a control signal CTRL Dl. A multi-directional support system mechanisation 110 of such an already printed object part 1000 (FIG. 16) enables the movement of the support stick 109 (FIG. 7), the conductive needle 115, and the already printed object part 1000 (FIG. 16) for the purpose of changing the spatial position relative to the particle sources 11, 12 (FIG. 7) during the printing process 100 (FIG. 13). Such an already printed object part 1000 as depicted in FIG. 16, becomes larger during the printing process 100 (FIG. 13) and in this way creates certain areas in the machine printing space 2 where it is harder for the beams $E_1$, $E_2$ to reach, and which are located in the shadow created by the beams $E_1$, $E_2$ and behind the mentioned already printed object part 1000 (FIG. 16.) The multi-directional support system mechanisation 110 depicted in FIG. 7 enables the movement of the already printed object 1000, the conductive needle 115, and the support stick 109 so that the mentioned areas in the shadow of the already printed object part are minimized The problem of unreachable areas in the shadow of the already printed object part, such as the already printed object part 1000, is therefore solved by multi-directional support system mechanisation 110 (FIG. 7) which enables the sequence of desired printing volumes and fabrication of the desired printing volumes in any direction. The multi-directional support system mechanisation 110 furthermore enables such an already printed object part 1000 as depicted in FIG. 16 to be rotated around the axes of the support stick 109.

FIG. 8 depicts an example embodiment of the machine 1 (FIG. 7) for additive manufacturing of three-dimensional objects comprising two particle sources 11, 12 and two windings 105, 106. Geometrical axes 13, 14 of particle sources 11, 12 are perpendicular to a common geometrical axis 107 of both windings 105, 106. It is claimed therefore that the geometrical axes 13, 14, 107 of constituent parts of the machine 1 (FIG. 7) can be individually spatially arranged without any mutual dependency in different example embodiments of the machine 1 such as those depicted in FIG. 7-FIG. 12.

FIG. 9 depicts an example embodiment of the machine 1 (FIG. 7) comprising three particle sources 11, 12, 61 (FIG. 9), two windings 105,106 and three independent linear mechanisations 117 of particle sources 11, 12, 61. The independent linear mechanisations 117 of particle sources 11, 12, 61 enable an additional printing direction pointing upwards and downwards as an addition to the printing direction from the centre horizontally outwards. Control signals CTRL H manage linear mechanisations 117 via control unit CT H.

Powdered material 102 is kept in a container 101 with a controlled release through a stopper 103. Finely dispersed powdered material 102 is transported into desired parts of the intersection volume 28 of beams $E_1$, $E_2$, $E_3$ using a time-varying and spatially non-homogenous magnetic field B created by windings 105, 106. By enlarging the divergences of particle beams $E_1$, $E_2$, $E_3$ melting of the powdered material 102 can occur in areas at the extreme edges of overlapping of such widely dispersed beams $E_1$, $E_2$, $E_3$ therefore further away from the intersection point 15 of geometrical axes of particle sources 11, 12, 61 (FIG. 9). If such more widely dispersed particle beams happen to be too weak to melt the material, the duration of melting is prolonged or deflectors in the system of magnetic lenses are used for directing the beams $E_1$, $E_2$, $E_3$ into parts which are further away from the intersection point 15.

This principle is taken into account whilst generating control signals CTRL before the printing process 100 (FIG. 13). In this way, the application of sufficient amount of kinetic energy of particles required for melting of the powdered material 102 (FIG. 9) is achieved during a predefined time interval even in those parts of the intersection of beams $E_1$, $E_2$, $E_3$ which are further away from the intersection point 15.

FIG. 10 depicts an example embodiment of the machine 1 (FIG. 7) comprising three particle sources 11, 12, 61 (FIG. 9), two windings 105,106 and a circular mechanisation 118. The circular mechanisation 118 enables rotation of the first particle source 11 relatively to the other two particle sources 12, 61 in a plane perpendicular to the axes of the other two particle sources 12, 61. It is claimed, that example embodiments of the machine 1 (FIG. 7-12) are possible in which the axis of one of particle sources, for example particle source 11 (FIG. 10), can spin relatively to the other particle sources, for example particle sources 12 and 61 during the printing process 100 (FIG. 13). The circular mechanisation 118 is managed by a control signal CTRL G via a control unit CT G.

FIG. 11 depicts an example embodiment of the machine 1 comprising four particle sources 11, 12, 61, 62 and four windings 105, 106, 205, 206. The machine 1 has a symmetry of a tetrahedron, and the geometrical axes of individual particle sources 11, 12, 61, 62 point in the directions of the three-fold axes of the tetrahedron and intersect in a common intersection point 15 in the centre of said tetrahedron. Machine 1 contains four windings 105, 106, 205, 206 for creation of the time-varying and spatially non-homogenous magnetic field B which is causing the movement of powdered material 102 into the predetermined melting volume. Powdered material 102 is kept and dosed in a similar way as in previously described example embodiments therefore in a container 101 with a stopper 103. Object, such as the object 3 (FIG. 14), is gradually fabricated with an initial overlapping of clusters which assemble beams in the parts surrounding the intersection point 15 (FIG. 12) where the conductive needle 115 (FIG. 7) is also positioned on top of the multi-directional support system mechanisation 110 and where the printing process 100 of fabricating said object starts.

Hereinafter the method of additive manufacturing of three-dimensional objects according to the present invention is described based on example fabrication of an object 3. The entire method of additive manufacturing of three-dimensional objects according to the present invention is divided into two main processes schematically depicted in FIG. 13 and which are a print preparation 5 and a printing process 100. Firstly, the main process named preparation for print 5 is described in detail.

The majority of three-dimensional additive manufacturing techniques require a preparation of the digital file of the 3D object, which is to be fabricated. Digital files which contain a record of a shape of such a three-dimensional object are presently known in multiple formats like StereoLythography (abbreviation .stl), Object file (abbreviation .obj) and others, and are usually created with the use of CAD (Computer Aided Design) software. This sort of digital file of a three-dimensional object usually contains a description of the outer layer or shape, respectfully and is prepared for fabrication using software which creates a control file the 3D printer can read and is therefore written in a programming language compatible with said 3D printer. An example of one of widely used formats of such control files is G-code, which is a file format commonly used for standard domestic 3D printers and which is written in a programming language using numerical controls (Numeric Control Programming Language)

According to the present invention and in the process named print preparation 5 a control file 10 is generated containing the record of all synchronised time-functions of control signals CTRL 1-CTRL H (FIG. 7, 8, 9), which manage all the control units CT 1-CT H of the machine 1 and consequently the machine's 1 entire operation during the printing process 100 (FIG. 13). To be able to execute the printing process 100 using the machine, for example the machine l(FIG. 7) according to the present invention, firstly the control file 10 (FIG. 13) is generated in print preparation 5; said control file, which is in a way comparable to the G-Code, but said control file 10, which significantly differs from said G-code due the fact that the printing process 100 using the machine 1 according to the present invention is executed in a predetermined curved three-dimensional printing volumes. The method and machine according to the present invention differ from all machines and methods known up until now also and specifically by the fact that the individual printing volumes are not thin flat and two-dimensional or layers, respectfully.

A digital file 4 of the three-dimensional object 3 containing a record of the shape or the outer surface of tree-dimensional object, respectfully is firstly read and imported into a system for print preparation 5, which is a constituent part of the machine 1 according to the present invention. Secondly, the print specifications 6 and machine specifications 7 are defined in the system for print preparation 5. Print specifications 6 contain all the information influencing the printing process 100 (FIG. 13), for example information on powder material (102), a predetermined fullness of the printed object (object can be either 100% full or it can have a defined three-dimensional structure, which is not necessarily completely full inside), a predefined thickness of outer object wall, an outer print resolution, printing directions, an initial printing point 151 (FIG. 14) position and other information deemed necessary. Machine specifications 7 contain all the parameters of machine 1 which are key to the differentiation between individual example embodiments of the machine 1 and influence the printing process 100 (FIG. 13). Machine specifications 7 therefore contain information such as: a number of particle sources $n_e$, mutual spatial arrangement of said particle sources including distances 20, 21 (FIG. 5) to the intersection point 15 and angles Ω between the geometrical axes of particle sources; a number of electrical windings $n_b$ for the purpose of magnetic levitation and a mutual spatial arrangement of said windings including distances to the intersection point 15 and angles between their geometrical axes; a size of a container 101 (FIG. 7) containing the powdered material 102; operating parameters of particle source mechanisations 117, 118 (FIG. 9,10), multi-directional support system mechanisation 110 (FIG. 7), and support stick mechanisation 114 which supports the fabricated object.

In the next step the above described a digital file 4 (FIG. 13) of the three-dimensional object, print specifications 6, and machine specifications 7 are imported into a simulator 8 of the printing process where a spatial division 50 of the digital file 4 of the three-dimensional object is performed using simulation of the printing process 100 according to a given example embodiment of the machine 1.

In the simulator 8 (FIG. 13) the digital file 4 (FIG. 13) of the three-dimensional object is spatially positioned so that an initial print point 151 (FIG. 14) is located in the three-dimensional object embedded in the digital file. In an coordinate system of the simulator 8 of machine 1, the initial print point 151 (FIG. 14) can be the same as the intersection point 15 inside the real space of the machine 1 (FIG. 7-12) performing the printing process 100 (FIG. 13), said point where at least two geometrical axes 13,14 of at least two particle sources 11,12 intersect in an individual example embodiment of the machine 1, such as those depicted in FIG. 7-12. If using an example embodiment of the machine 1 which enables a plurality of intersection points 15 of geometrical axes, for example those depicted in FIG. 9-12, the initial print point in the coordinate system in the simulator 8 (FIG. 13) can be placed into one of the intersection points of said plurality.

In the next step a sequence 51 of individual print volumes 1, 2, 3 . . . Z (FIG. 13) is generated with the spatial division 50 in simulator 8 simulating the printing process, said sequence 51 of print volumes 1, 2, 3 . . . Z comprising Z number of individual print volumes. Individual print volumes as depicted in FIGS. 13 and 14 are individual print volumes 152, 153, 154 . . . 2000. During the described example of the printing process 100 using machine 1 (FIG. 7-12), a three-dimensional object 3 (FIG. 14), is gradually manufactured by fabrication of sequential individual print volumes 1, 2, 3 . . . Z (FIG. 13) in the sequence 51. During the spatial division 50 of the three-dimensional object's digital file 4 into the sequence 51 of individual print volumes 1, 2, 3 . . . Z, the simulator 8 maximizes the volume of each individual print volume 1, 2, 3 . . . Z in a way so that the said individual print volume 1, 2, 3 . . . .Z is limited only by the amount of melting energy and the amount of powdered material 102 (FIG. 7) capable of being melted by machine 1 in a specific time. The intersection volume 28 (FIG. 3) and consequently the melting volume 280 are therefore drastically enlarged for example inside of the object 3 (FIG. 14) which is used for description herein, because the printing process 100 enables fabrication of print volumes inside of the object 3 which does not affect the external appearance (printing resolution on the surface) of the finished, fabricated object 3.

In the simulator 8 each individual print volume 1, 2, 3 . . . Z in the sequence 51 is appropriated and adjusted to be equal to a specific intersection volume 28 or melting volume 280 of plurality of particle sources 11, 12 according to the given example embodiment of the machine, such as machine 1 (FIG. 7-12), and according to the given step of the printing process 100 (FIG. 13). An individual print volume 1, 2, 3 . . . Z can be fabricated and assembled using plurality of intersection volumes 28 (FIG. 4) as it was already explained that the machine 1 enables melting of material in multiple directions and in plurality of smaller constituent intersection volumes 45, 46, 47, 48, 49, 410 at the same time.

Using simulation of fabrication of individual print volumes 1, 2, 3 . . . Z (FIG. 13), the simulator 8 dedicates a required number of particle sources for each individual print volume 1, 2, 3 . . . Z and also adjusts the divergence, the deflection, the pulsating and all other required parameters of particle sources. In this way, later during the printing process 100 (FIG. 13) particle clusters such as 160, 170 (FIG. 2) are formed, said exemplary clusters 160, 170 which are required for melting of the material in each individual print volume 1, 2, 3 . . . Z during a specific time interval. Simulator 8 therefore attributes and predetermines all required parameters of the machine 1 for the printing process 100 of each, individual print volume 1, 2, 3 . . . Z in the sequence. In the simulator 8 (FIG. 13) the process of attributing and appropriating required parameters of the machine 1 is repeated for each and every individual print volume 1, 2, 3 . . . Z separately and in such a way the sequence 51 of print volumes 1, 2, 3 . . . Z is created and all the required control signals CTRL 1-CTRL H are generated for fabricating an object, such as the object 3 (FIG. 14) using the printing process 100. Whilst generating the sequence 51 (FIG. 13) of print volumes 1, 2, 3 . . . Z, the simulator 8 takes the volumetric parts in the shadow created by an exemplary already printed object part 1000 (FIG. 16) during any given step of the printing process 100 (FIG. 13) into account. Whilst generating the sequence 51 of individual print volumes 1, 2, 3 . . . Z it can also be determined ahead that a surface of the object shall be fabricated using a high print resolution and the internal parts of the object shall be fabricated using a lower print resolution. At the surface of the object, such as an object 3 depicted in FIG. 14, smaller print volumes can be fabricated enabling a high printing resolution, and larger print volumes can be fabricated inside.

In the next step in a generator 9 and based on the sequence 51 of print volumes 1, 2, 3 . . . Z acquired using simulation, a control file 10 is generated containing all the required control signals such as control signals CTRL 1-CTRL H (FIG. 7-10) operating control units CT 1-CT H of the machine 1 (FIG. 6, 12) used in this example later during the printing process 100 (FIG. 13) of an object, such as object 3 (FIG. 14). Said control file 10 (FIG. 13) is therefore a record of different time functions and contains synchronised control signals CTRL 1-CTRL H (FIG. 7-10) operating the control units CT 1-CT H during the printing process 100 (FIG. 13) with the machine 1. Whilst generating the final control file 10 (FIG. 13) the duration of all control signals CTRL 1-CTRL H is determined according to the melting point of the material and capacity of the example embodiment of the machine 1 being used.

In the generator 9 the creation and synchronisation of all other control signals is achieved, for example a control signal CTRL C1 (FIG. 7) managing the stopper 103 on the container and an actuator 104, a control signal CTRL F1 managing the connection of conductive needle 115 to the ground connection or a predefined higher $W_1$ or a predefined lower electric potential $W_2$, control signal CTRL D1 for managing mechanisation 114 of the support stick 109, control signal CTRL E1 managing the multi-directional support system mechanisation 110, control signal CTRL H (FIG. 9) managing the linear mechanisation 117, control signal CTRL G (FIG. 10) managing the circular mechanisation 118 and other possibly required control signals. When the process of print preparation 5 (FIG. 13) is completed the control file 10 is used for the execution of the printing process 100 by using one of example embodiment of the machine 1, for example those depicted in FIG. 7-12.

Hereinafter the detailed description of a printing process 100 (FIG. 13) will be given based on an example of fabrication of the three-dimensional object 3 depicted in the FIG. 14 and using an example embodiment of machine 1 comprising six particle sources ($n_e$=6) and six windings ($n_b$=6) such as depicted in FIG. 6 and FIG. 12. In the described example the real three-dimensional object 3 (FIG. 14) will be fabricated using the printing process 100 (FIG. 13) using the machine 1 wherein said object 3 (FIG. 14) is the one of which the digital file 4 (FIG. 13) was defined in print preparation 5, and is in this example shaped as a cat.

FIG. 14 depicts a cross-section of an example of the spatial division 50 of the digital file of the three-dimensional object 4 (FIG. 13) in simulator 8, and at the same time depicts the sequence 51 of individual print volumes 1, 2, 3 . . . Z the fabrication of which will result in progressive fabrication of the object 3 (FIG. 14) during the printing process 100 (FIG. 13) in real space.

In the print preparation 5 (FIG. 13) the shape contained in the digital file 4 of the three-dimensional object is positioned in the coordinate system of simulator 8 of the machine 1 (FIG. 12), so that later a print volume 1 152 (FIG. 14) shaped as a sphere in real space is fabricated during printing process 100. The centre of the print volume 1 152 is therefore the initial print point 151 which can be the same point as the intersection point 15 of geometrical axes of particle sources 11, 12, 61, 62, 63, 64 in the case where an example embodiment of the machine 1 as depicted in FIG. 12 is used. The end of the conductive needle 115 also reaches up to the initial print point 151 (FIG. 14). As shown with example embodiments of the machine 1 as depicted in FIG. 6 and FIG. 12 the use of predetermined control signals CTL 1-CTRL H enables an intersection volume 28 to be shaped as a sphere with a diameter 2R, said intersection volume 28 of all six particle sources 11, 12, 61, 62, 63, 64 in this case. The diameter 2R of the created sphere can be arbitrarily modified by individually controlling divergences $\alpha_1$-$\alpha_6$ of beams and lengths $L_1$, $L_2$, $L_3$, $L_4$, $L_5$, $L_6$ of individual particle clusters in cluster series 16, 17, 65, 66, 67, 68.

Hereinafter firstly the steps of the printing process 100 (FIG. 13) of fabricating an individual print volume 1,2, 3 . . . Z in the sequence 51 generated with spatial division 50 during the print preparation 5 will be described in detail. The description continues based on an example of fabricating an object 3. Within the first step of the printing process 100 of fabricating a print volume 1 152, which is shaped as a sphere in this example embodiment, the powdered material 102 (FIG. 7) is added into the printing space 2 of the machine 1 in a way in which for a predetermined duration the stopper 103 is opened on the container 101 which is controlled by a control signal CTRL C1 and is storing the powdered material 102. A controlled amount of powdered material 102 is added into the printing space 2 of the machine 1 in this way. Within this step of the printing process 100 (FIG. 13) it is also assured that the conductive needle 115 (FIG. 7) is positioned at the appropriate position so that it reaches up to the initial print point 151 (FIG. 14). If necessary, the movement of the conductive needle 115 (FIG. 7) and the support stick 109 is done by using the multi-directional support system mechanisation 110. If necessary, a mechanical actuator 104 (FIG. 7) for the powdered material 102 is switched on, said actuator 104 controlled by a control signal CTRL C1 via control unit C1 and which is assuring that the powdered material 102 is not glued together or in larger grains whilst exiting into printing space 2 through the exit managed by the stopper 103. In the next step the stopper 103 for releasing of powdered material 102 into the printing area 2 is closed, and the system for producing a magnetic field B with the windings 105, 106, 205, 206, 207, 208 controlled by control signals CTRL B1-B6 via control units CT B1-B6 and enabling the transport of powdered material 102 into the desired melting volume, is switched on (herein meaning that the magnetic field B starts to occur). In this step of the printing process 100 (FIG. 13) the now finely dispersed powdered material 102 (FIG. 7) is transported into a predetermined print volume 1 152 surrounding the area of initial print point 151 (FIG. 14) with the use of the magnetic force. The conductive needle 115 (FIG. 7) is already positioned at the initial print point 151 (FIG. 14) and the first print volume 1 152 in the shape of a sphere which is surrounding the initial print point 151 will be fabricated henceforth. When the powdered material 102 (FIG. 7) is positioned in the predetermined print volume 1 152 surrounding the initial print point 151, the particle sources 11, 12, 61, 62, 63, 64 (FIG. 12) are switched on (herein meaning starting to emit particle clusters) and the windings 105, 106, 205, 206, 207, 208 are switched off (herein meaning the electric field B is set to zero value). In the case where the magnetic field B does not interfere with the movement of particles from particle sources 11, 12, 61, 62, 63, 64 into the initial printing point 151 surroundings, it is taken into account that particles need some time $t_e$ to travel from the particle sources 11, 12, 61, 62, 63, 64 (FIG. 12) to the initial print point 151 (FIG. 14) therefore the magnetic field B can be set to zero value in the moment immediately after the time $t_e$ after the particle sources 11, 12, 61, 62, 63, 64 are switched on, therefore at the moment when it is known that particles arrive either near or inside the print volume 1 152 (FIG. 14).

Predefined particle clusters in cluster series 16, 17, 65, 66, 67, 68 (FIG. 6, 12) will therefore synchronously overlap in the print volume 1 152 (FIG. 14) which is the intersection volume 28 (FIG. 6) at the same time and is surrounding the intersection point 15 of geometrical axes of particle sources 11, 12, 61, 62, 63, 64 (FIG. 6,12).

At the moment when particles emitted from plurality of particle sources 11, 12, 61, 62, 63, 64 arrive into the intersection volume 28 and have individually predetermined vector velocities $\vec{v}_1, \vec{v}_2, \vec{v}_3, \vec{v}_4, \vec{v}_5, \vec{v}_6$, the melting volume 280 is created in which the total, high density of kinetic energy of particles causes the powdered material 102 to melt within the intersection volume 28, provided that the total, high density of kinetic energy of particles exceeds the threshold required to melt the powdered material. The powdered material 102 melts inside the melting volume 280 and melted powdered material 1020 is created as depicted in FIG. 16.

During particle collision (elastic or non-elastic) with the powdered material, the total linear and angular momentum is conserved. In the case of non-elastic collisions between the particles emitted from particle sources and the powdered material, the entire momentum of particles will be transferred onto the powdered material and therefore the conservation of the total momentum can be used in a way in which a push force is exerted onto the melted powdered material 1020, said push force which causes the powdered material to move with a specific velocity after collisions with particles. Due to the conservation of momentum the push force exerted by particles emitted from particle sources can effectively be used for routing the melted powdered material 1020 onto a desired, final position on the already printed object part 1000.

With appropriate synchronisation of individual particle clusters from all cluster series such as 16, 17, 65, 66, 67, 68 (FIG. 6) it can therefore be achieved so that the transfer of momentum of particles directs the final application of the melted powdered material 1020 (FIG. 16) onto the already printed object part 1000 of the object being fabricated. In the described example in which the first printing volume 1 152 (FIG. 14) shaped as a sphere is being fabricated, the melted material drops 1020 are applied onto the conductive needle 115. In addition to the transfer of momentum of particles onto the melted powdered material 1020 during collisions, the electric force can be used; said electric force either between the particles and the already printed object part 1000 or in the case of fabrication of the first print volume 1 between the particles and the conductive needle 115 (FIG. 16). This is done by using the switch 112 to electrically connect either the already printed object part 1000 with the conductive needle 115 or during the initial step of fabrication only the conductive needle 115 (FIG. 16) to a higher electric potential $W_1$ from outside source of voltage. It is understood that the electric potential $W_1$ from outside source can also be lower. In the previously described step of pre-defining and generating control signals CTRL 1-6 (FIG. 6) managing pulsation, firstly, the parts of control signals dedicated to the purpose of melting powdered material were defined and generated and secondly, an additional signal dedicated to the purpose of applying the melted powdered material 1020 (FIG. 16) onto the final, desired position could have been additionally generated.

In the next step of the printing process 100 (FIG. 13) after the melted powdered material 1020 is applied onto the already printed object part 1000, the particle sources 11, 12, 61, 62, 63, 64 are switched off (herein meaning the emission of particles stops), and a grounding switch 111 can be switched on (meaning the connection is made) and removal of excessive particles from the surface or the interior parts of an already the printed object part 1000 (FIG. 16) is executed in this way. The support stick 109 surrounding the conductive needle 115 (FIG. 16) is always reaching up to the already printed object part 1000 and in this way offers additional mechanical support. After these so far described steps of the printing process 100 (FIG. 13) the melted powdered material 1020 cools down and solidifies and therefore creates a solid ball which is supported by the support stick 109 (FIG. 16) and has the conductive needle 115 in it. During the printing process 100 (FIG. 13) of an object 3 the conductive needle 115 therefore becomes a part of the already printed object part 1000 (FIG. 14), and the wider support stick 109 (FIG. 16) can be gradually moved away from the already printed object part 1000 (FIG. 16) just enough as it is required for said conductive needle 115 to always stay in connection to the surface of the already printed object part 1000, and for said support stick 109 to serve as a mechanical support for the already printed object part 1000. If necessary, in the next step of the printing process 100 (FIG. 13) the already printed object part 1000 (FIG. 16) is moved using the multi-directional support system mechanisation 110 (FIG. 7) to a desired position for the purpose of fabricating the next printing volume in the sequence 51 (FIG. 13) and after this, the above described steps of the printing process 100 enabling the fabrication of the print volume 1 152 (FIG. 14) are repeated for the purpose of fabrication of the next print volume in the sequence 51 (FIG. 13). In the described implementation example shown in FIG. 14 the next print volume in the sequence 51 is a print volume 2 153 shaped as a shell.

Fabrication of the print volume 2 153 is done in a way in which the control signals CTR 1-6 (FIG. 6), which manage particle sources 11, 12, 61, 62, 63, 64, increase the diameters r of the beams $E_1, E_2, E_3, E_4, E_5, E_6$ using predetermined divergences $\alpha t_1, \alpha_2, \alpha_3, \alpha_4, \alpha_5, \alpha_6$; and the location of the intersection volume 28 is kept positioned in the centre of the system meaning its centre coincides with the intersection point 15 which coincides with the initial print point 151 (FIG. 14) in this case. In this step of the printing process 100 enabling the fabrication of the next print volume 2 153 (FIG. 13, 14) which is shaped as a shell in this case and is the next print volume in the sequence, the clusters of particles overlap in a larger intersection volume 28 (FIG. 3) and melting volume 280 which both have a larger diameter in said step. This leads to melting of the powder material in said larger print volume 2 153 (FIG. 13, 14) shaped as a shell and concentric with respect to the first, already fabricated print volume 1 151 shaped as a sphere. In the next step the steps of the printing process described above are repeated and the next print volume 3 154, which is also shaped as a shell, is fabricated using furthermore widened beams.

In the example embodiment of the spatial division 50 (FIG. 13) and the printing process 100 schematically depicted in FIG. 14, all of the described steps of the printing process 100 enabling fabrication of individual print volumes 1, 2, 3 . . . Z using machine 1 (FIG. 6, 12) are repeated for each and every individual print volume 1, 2, 3 . . . Z (FIG. 13) in sequence 51. During the printing process 100 all of the above described steps enabling fabrication of an individual print volume 1 152 are repeated including all the steps from releasing the powdered material by opening the stopper 103 (FIG. 7) on the container 101 and into the printing area 2 of a machine 1, up to the discharging of an already printed object part 1000 (FIG. 16) using switch 111, and if necessary, the re-location of the already printed object part 1000 to a predefined position using the multi-directional support system mechanisation 110 (FIG. 7).

Consecutive fabrication of individual print volumes 1, 2, 3 . . . Z (FIG. 13), which are shaped as shells in this example embodiment, continues until the surface of the already printed object part 1000 (FIG. 16) approaches the surface of the object 3 being fabricated wherein said already printed object part 1000 is an internal constitutive part of the object object 3 (FIG. 14). In the example embodiment described herein and depicted in FIGS. 14 and 15, the largest internal constitutive part of the exemplary object 3(FIG. 14) is the largest fabricated print volume 155 shaped as a shell and which forms a ball comprising balls created by fabrication of the print volume 1 152, the print volume 2 153 and the print volume 3 154; and therefore resembles a first approximation of the exemplary object 3. In the given example all internal volumes of the desired object 3 are fabricated using a sequence of larger and thicker print volumes which do not affect the external appearance of the object 3 shaped as a cat (FIG. 14) in this example.

As mentioned before, in the simulator 8 (FIG. 13) the sequence 51 of print volumes 1, 2, 3 . . . Z is determined in a way so that later during each, consecutive step of the printing process 100 which enables fabrication of individual print volumes 1, 2, 3 . . . Z in sequence 51, the shadow which is created by the already printed object part 1000 (FIG. 16) is avoided. As an example, during the fabrication of the print volume 3 155 (FIG. 14) shaped as a shell, the shadow created by the print volume 2 152 is therefore considered.

The so far described steps are repeated during fabrication of each and individual print volume 1, 2, 3 . . . Z (FIG. 13) in sequence 51 and include all the steps from the initial the step of releasing powdered material 102 (FIG. 7) into the printing space 2 of the machine 1 by opening a stopper 103 on the container 101 up to the step of discharging the already printed part 1000 (FIG. 16) using the switch 111 and, if necessary, the mechanical movement of the object using multidirectional support system mechanisation 110. In the next step of the printing process 100 the centre of the intersection volume 28 (FIG. 1) is moved to two new points, 156 and 1560 (FIG. 14). In these steps of the printing process 100 (FIG. 13) enabling fabrication of the successive print volume in sequence 51, the powdered material 102 (FIG. 7) is melted in the intersection volume 28 so that both print volume 157 and print volume 1570 are created simultaneously. Print volume 157 and print volume 1570 are fabricated onto the shell surface of the print volume 155, and are fabricated outwards from these new initial printing points 156 and 1560 into all possible directions simultaneously. Each of the individual print volumes 1, 2, 3 . . . Z (FIG. 13) can therefore be assembled from a plurality of print volumes depending on the capacity of the example embodiment of the machine 1 used for the printing process 100 (FIG. 13), wherein said plurality comprises print volumes such as print volume 157 and print volume 1570 (FIG. 14) in this example. After print volume 157 and print volume 1570 are fabricated, a simultaneous fabrication of print volume 158 and print volume 158 follows, and afterwards, the simultaneous fabrication of print volume 159 and print volume 1590. An increasingly larger constituent part of the final printed object 3 (FIG. 14) is achieved with such sequential steps of the printing process 100 (FIG. 13) enabling fabrication of individual print volumes in the sequence. During the printing process 100 it is therefore possible to simultaneously fabricate a plurality of print volumes which are located in different spatial locations and as depicted in FIG. 14 by print volumes 158 and 1580. Machine 1 therefore enables the fabrication in various different printing directions simultaneously depending on the capacity of the example embodiment of the machine 1 being used for fabrication. In the example depicted in FIG. 14 the print volume 157, which is shaped as a shell, can be fabricated simultaneously with the print volume 1570, wherein said print volumes 157 and 1570 are fabricated at the opposite sides of the already printed shell of the print volume 155 and therefore by using different particle sources.

FIG. 15 schematically depicts the printing process 100 (FIG. 13) flow in time and is also a schematic depiction of the sequence 51 (FIG. 13) of individual print volumes. A bold line indicates the main possible simultaneous printing directions from the centre outwards during the printing process 100.

Based on the above described fabrication steps it is evident that the entire printing process 100 (FIG. 13) is carried out in a way in which the addition, melting, and discharging of the material is sequentially executed for each individual print volume 1, 2, 3 . . . Z in sequence 51 separately. These steps of the printing process 100 which enable the fabrication of each print volume are therefore repeated for each of the following print volume in the sequence 51. After each and every following step of the printing process 100 enabling the fabrication of the next print volume in the sequence 51, the newly fabricated part is added onto an already printed object part such as 1000 (FIG. 16) in this example. During further sequential execution of the steps of the printing process (FIG. 13), the shape of such an already printed object part 1000 will become more and more similar to the shape of the desired object, which is a cat in the given example. It is clear that the print resolution can be improved when fabrication approaches the desired object's surface or the shape of the desired object, respectfully. Print resolution is defined by the diameter 2R (FIG. 6) of the intersection volume 28 of the beams E, and in this example embodiment equals the diameters 2R of spheres and shells created by melting of the powdered material by overlapping particle beams.

From FIG. 16 it is evident that already an example embodiment of the machine 1 (FIG. 7) comprising two particle beams $E_1, E_2$ enlarges the individual print volumes 1, 2, 3 . . . Z in comparison with fabrication of such an object by sequential stacking of thin two-dimensional layers in height z, as other known machines in this field do. Depicted in FIG. 16 are two particle beams $E_1$, $E_2$ geometrical axes of which intersect at the end of conductive needle 115. In this example the intersection volume 28 is a complex shaped body which is partially surrounding the already printed object part 1000. Melted powdered material 1020 is applied to the surface of the already printed object part 1000 using electric force. Said electric force is created by connecting the conductive needle 115 using the switch 112 to a higher electrical potential $W_1$ for a specific time or duration. The duration of connection of the conductive needle 115 to a higher electric potential $W_1$ can determine the amount (thickness) of the powdered material 102 which gathers on the surface of the already printed object part 1000.

The invention claimed is:

1. A machine for additive manufacturing of three-dimensional objects, the machine comprising:
    a first source (11) of particles with mass emitting a first beam ($E_i$);
    a first system of magnetic lenses (18) for determining divergence ($\alpha$) and deflection of said beam ($E_i$);
    a first control signal (CTRL 1) which manages the first source (11) of particles with mass via a control unit (CT 1) and causes the creation of the said predetermined beam ($E_i$);
    a second source (12) of particles with mass emitting a second beam ($E_2$); a second system of magnetic lenses (19) for determining divergence ($\beta$) and deflection of said second beam ($E_2$);
    a second control signal (CTRL 2) which manages the second source (12) of particles with mass via a control unit (CT 2) and causes the creation of said predetermined beam ($E_2$),
    a vacuum chamber (116);
    characterised in that the control signal (CTRL 1) for controlling the first source (11) and the control signal (CTRL 2) for controlling the second source (12) are mutually arranged in a timely manner and created in a way in which two or more predefined clusters (160, 170) emitted from different sources (11,12) overlap in a predefined volumetric part of a printing space (2) of the machine (1) and in this way create a curved three-dimensional intersection volume (28) inside of which a melting volume (280) occurs where the sum of energies of the predefined individual clusters (160,170) exceeds the energy threshold required for melting of a powdered material (102) located in the melting volume (280), and said sum of energies therefore causes melting of the powdered material (102), wherein excessive charge is removed from an already printed object part through a conductive needle (115) which is connected electrically to the surface of said already printed object part and controlled with said control unit (CT 1) via said control signal (CTRL 1).

2. The machine according to claim 1, characterised in that the machine comprises a plurality of particle sources (11, 12, 61, 62, 63, 64), a plurality of control signals (CTRL 1, CTRL 2, CTRL 3, CTRL 4, CTRL 5, CTRL 6) and a plurality of control units (CT 1, CT 2, CT 3, CT 4, CT 5, CT 6).

3. The machine according to claim 2, characterized in that said plurality of particle sources (11, 12, 61, 62, 63, 64) are spatially arranged so that the geometrical axes of said sources (11, 12, 61, 62, 63, 64) intersect in an intersection point (15) or in a plurality of intersection points at angles between 0-360 degrees and that distances from all said sources (11, 12, 61, 62, 63, 64) to the intersection point (15) or the plurality of intersection points are in a range from 10 cm to 20 m.

4. The machine according to claim 2, characterized in-that the particles with mass emitted from said plurality of particle sources (11, 12, 61, 62, 63, 64) are electrons.

5. The machine according to claim 1, characterized in that the spatial location of the intersection volume (28) is controlled with use of time delays $t_f$ between at least two individual clusters emitted separately from at least two said sources (11, 12).

6. The machine according to claim 1 characterised in that the size of the intersection volume (28) is controlled by modulating said divergence ($\alpha$) of beam emitted from the first source (11), said divergence ($\beta$) of beam emitted from the second source (12), a length (L1) of the individual cluster (160) emitted from the first source (11) and a length (L2) of the individual cluster (170) emitted from the second source (12).

7. The machine according to claim 1 or 2, characterised in that the individual intersection volume (28) can be assembled from a plurality of smaller volumes; that the powdered material (102) is kept in a container (101) with a stopper (103) before printing and that the exit of said container (101) is equipped with an actuator (104) for the purpose of dispersing the powdered material (102) and said stopper (103) is controlled with the control unit (CT C1) via control signal (CTRL C1);
    that one (11) or said plurality of particle sources (12,61) is geared with a linear mechanisation (117) enabling movement of said sources (11,12,61) and/or circular mechanisation (118) enabling rotation of one (11) of said sources relative to the other said sources (12,61).

8. The machine for additive manufacturing of three-dimensional objects according to claim 1, characterized in that the powdered material (102) is transported to the melting area with use of an magnetic field B created with a first winding (105) and a second winding (106).

9. The machine according to claim 8, characterized in that it comprises a plurality of windings (105, 106, 205, 206, 207, 208).

10. The machine according to claim 8, characterized in that the melting area is a melting volume (280) which has a curved surface.

11. The machine according to claim 1, characterized in that the melting volume (280) is inside the intersection volume (28) of at least two beams emitted from atleast two spatially arranged sources (11,12).

12. The machine for additive manufacturing of three-dimensional objects according to claim 1 or 8, characterized in that the powdered material (102) and/or melted powdered material is transported onto said already printed object part with an electrostatic pull between the powdered material (102) and said already printed object part using the control signal (CTRL F1) and the control unit (CT 1) controlling a switch (112) for creating electric connection between the conductive needle (115) and a higher electric potential($W_1$) and a switch (113) for creating electric connection between the conductive needle (115) and a lower electric potential ($W_2$).

* * * * *